US008820949B2

(12) United States Patent
Takeda

(10) Patent No.: US 8,820,949 B2
(45) Date of Patent: Sep. 2, 2014

(54) KEY SHEET, LIGHT BLOCKING EFFECT SHEET, PUSH BUTTON SWITCH AND KEY SHEET MANUFACTURING METHOD

(75) Inventor: Yasunori Takeda, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 1101 days.

(21) Appl. No.: 12/344,739

(22) Filed: Dec. 29, 2008

(65) Prior Publication Data

US 2010/0147661 A1 Jun. 17, 2010

(30) Foreign Application Priority Data

Dec. 16, 2008 (JP) ................................ 2008-320179

(51) Int. Cl.
*G01D 11/28* (2006.01)
*H01H 9/00* (2006.01)
*H01H 13/83* (2006.01)

(52) U.S. Cl.
CPC ......... *H01H 13/83* (2013.01); *H01H 2219/064* (2013.01); *H01H 2219/056* (2013.01); *H01H 2219/044* (2013.01); *H01H 2219/034* (2013.01); *H01H 2219/062* (2013.01); *H01H 2219/03* (2013.01)
USPC .................... 362/23.03; 362/23.09; 362/23.1; 362/23.16; 362/23.17; 362/23.14

(58) Field of Classification Search
CPC .. G02B 6/0011; G02B 6/0013; G02B 6/0015; G02B 6/0023; G02B 6/0025; G02B 6/0031; G02B 6/0033; G02B 6/0035; G02F 1/133602–1/133606; H01H 2219/028; H01H 2219/03; H01H 2219/034; H01H 2219/036; H01H 2219/064; H01H 2219/056; H01H 2219/06; H01H 2219/0622
USPC ......... 362/26, 27, 30, 85, 600, 602, 606–608, 362/612, 617–619; 200/5 A, 310–315, 512, 200/517; 345/168–170
See application file for complete search history.

(56) References Cited

U.S. PATENT DOCUMENTS

| | | | | |
|---|---|---|---|---|
| 4,714,983 | A * | 12/1987 | Lang | 362/27 |
| 5,510,782 | A * | 4/1996 | Norris et al. | 341/22 |
| 6,498,311 | B1 * | 12/2002 | Stewart et al. | 200/313 |
| 6,644,822 | B2 * | 11/2003 | Kumagai | 362/26 |
| 6,984,799 | B2 * | 1/2006 | Kawaguchi et al. | 200/512 |
| 7,683,279 | B2 * | 3/2010 | Kim | 200/310 |
| 7,896,511 | B2 * | 3/2011 | Joo et al. | 362/24 |
| 2005/0083672 | A1 * | 4/2005 | Shipman et al. | 362/26 |

(Continued)

FOREIGN PATENT DOCUMENTS

| | | |
|---|---|---|
| JP | U6-45222 | 6/1994 |
| JP | 2002093266 | 3/2002 |

(Continued)

*Primary Examiner* — Thomas Sember
(74) *Attorney, Agent, or Firm* — Cermak Nakajima LLP; Tomoko Nakajima

(57) ABSTRACT

Provided is a key sheet or a lightproof light guiding sheet guiding light efficiently through an interior of the key sheet and preventing light leakage through a periphery of key tops. On a base sheet, a transparent resin layer, and further, a lightproof dark print layer are provided as needed, with at least one of the transparent resin layer and the lightproof dark print layer being formed of a non-corrosive coating liquid. Further, a smooth surface is formed between the base sheet and the dark print layer.

20 Claims, 10 Drawing Sheets

(56) References Cited

U.S. PATENT DOCUMENTS

| | | | | |
|---|---|---|---|---|
| 2006/0254894 | A1* | 11/2006 | Jung et al. | 200/314 |
| 2007/0045095 | A1* | 3/2007 | Nakanishi et al. | 200/512 |
| 2007/0285947 | A1* | 12/2007 | Kim | 362/631 |
| 2008/0143560 | A1* | 6/2008 | Shipman | 341/22 |
| 2008/0198625 | A1* | 8/2008 | Inoue | 362/617 |
| 2008/0237011 | A1* | 10/2008 | Lee et al. | 200/314 |
| 2008/0266832 | A1* | 10/2008 | Tamura | 362/26 |
| 2008/0310141 | A1* | 12/2008 | Mezouari | 362/30 |
| 2009/0059553 | A1* | 3/2009 | Lin | 362/26 |
| 2009/0107816 | A1* | 4/2009 | Chen et al. | 200/314 |
| 2010/0020528 | A1* | 1/2010 | Feit | 362/30 |

FOREIGN PATENT DOCUMENTS

| | | |
|---|---|---|
| JP | 2003245939 | 9/2003 |
| JP | 2004327417 | 11/2004 |
| JP | 2005100981 | 4/2005 |
| JP | 2006-318905 | 11/2006 |
| JP | 2007-027115 | 2/2007 |
| JP | 2007026837 | 2/2007 |
| JP | 2007087749 | 4/2007 |
| JP | 2007234532 | 9/2007 |
| JP | 2008140766 | 6/2008 |
| JP | 2008204769 | 9/2008 |
| WO | WO2008/072666 | 6/2008 |

* cited by examiner

KEY SHEET, LIGHT BLOCKING EFFECT SHEET, PUSH BUTTON SWITCH AND KEY SHEET MANUFACTURING METHOD

This application claims priority under 35 U.S.C. §119 to Japanese Patent Application No. 2008-320179, filed Dec. 16, 2008, the entirety of which is incorporated by reference herein.

BACKGROUND OF THE INVENTION

1. Field of the Invention

The present invention relates to a technology for illuminating a pushbutton switch key sheet used for performing input on portable information terminals such as a mobile phone, a PDA, and a portable music player, and various electronic apparatuses such as an AV apparatus. In particular, the present invention relates to an illumination type key sheet, a light-proof light guiding sheet for use in the key sheet, a pushbutton switch provided with the key sheet, and a method of manufacturing the key sheet.

2. Description of the Related Art

Pushbutton switches for portable information terminals and various electronic apparatuses such as an AV apparatus usually adopt a structure in which a key sheet with pushbuttons (key tops) is placed on a circuit board on which contact switches are arranged. Further, in order to achieve enhanced operability in dark places, there is adopted backlight illumination, in which the key sheet is brightly illuminated with light from an inner light source provided on the back surface side of the key sheet.

As an example of such an illumination type pushbutton switch, JP 2008-140766 A discloses a structure in which a light guiding sheet (light guide) is provided between a circuit board on which contact switches (metal domes) are arranged and a key sheet (operation switch sheet) provided with key tops and a base sheet (elastic sheet). By thus providing a light guiding sheet, light can be passed through the light guiding sheet to be transmitted to the entire key sheet.

However, the structure disclosed in JP 2008-140766 A has a problem in that, due to the thickness of the light guiding sheet, the thickness of the pushbutton switch is so much the larger, that the number of components increases, and that the light guiding sheet held between the contact switches and the key sheet blunts the click feel, resulting in deterioration in operational feel. In view of this, there has been proposed an improved structure in which a highly transparent resin film is used as the base sheet and in which the base sheet also serves as the light guiding sheet, thereby avoiding an increase in the thickness of the pushbutton switch and the number of components and deterioration in operational feel.

In an illumination type pushbutton switch, a dark print layer is sometimes provided on the base sheet so as to cover the intervals between the key tops so that the light from the inner light source may not be allowed to leak through the periphery of the key tops. Provision of such a dark print layer in the above-mentioned improved structure involves provision of a dark print layer on the surface of the base sheet formed of a highly transparent resin film, and hence the dark print layer absorbs light transmitted to the interior of the base sheet, resulting in a reduction in the illumination luminance of the pushbutton switch.

SUMMARY OF THE INVENTION

The present invention has been made in view of the above-mentioned problem in the prior art. It is therefore an object of the present invention to provide a technology which helps to prevent light from being easily allowed to leak through the periphery of the key tops with inhibiting a reduction in the illumination luminance of the pushbutton switch.

In order to achieve the above-mentioned object, the present invention provides the following construction.

That is, the present invention provides a key sheet allowing illumination, including: a base sheet formed of a transparent resin film; and at least one depressing operation portion provided on an operation surface side of the base sheet, in which the base sheet is a light guiding sheet, in which a transparent resin layer is provided on at least one surface of the base sheet, and in which a dark print layer shielding light is further provided on a surface of the transparent resin layer, with a smooth surface being provided between the base sheet and the dark print layer.

Generally speaking, in order to enable the key sheet to be illuminated, an inner light source such as an LED is provided inside an apparatus in which the key sheet is mounted. Usually, in order to illuminate the key sheet, the inner light source is provided in a lower portion of the key sheet. However, the base sheet is a light guiding sheet, and hence it is possible to effect illumination by causing light to enter the base sheet through an end surface of the base sheet. As a result, it is possible to provide the inner light source not in the lower portion but at an end portion of the key sheet. Thus, it is possible to reduce the distance between the key sheet and the circuit board on which the inner light source is provided, making it possible to achieve a reduction in the thickness of the apparatus.

Further, on at least one surface of the base sheet, there is provided a dark print layer preventing light from being transmitted through a transparent resin layer, and hence it is possible to prevent light from being transmitted through the base sheet to be leaked to the exterior. Not all of the light emitted from the inner light source is allowed to enter the base sheet. A portion of the light is caused to enter the space between the key sheet and the circuit board. This light may undergo diffused reflection inside the apparatus, and may be transmitted in the direction of the thickness of the base sheet to be radiated through the intervals between the depressing operation portions. When light is thus radiated through the intervals between the depressing operation portions, light leakage occurs from the apparatus. However, if a dark print layer shielding light is provided on at least one surface of the base sheet, the light that has undergone diffused reflection cannot be transmitted through the key sheet, thus preventing light leakage.

Further, a smooth surface is provided between the base sheet and the dark print layer. That is, of the interface between the base sheet and the transparent resin layer and the interface between the transparent resin layer and the dark print layer, at least one is a smooth surface. In other words, at least one of the following surfaces is a smooth surface: the surface of the transparent resin layer facing the base sheet, the surface of the base sheet facing the transparent resin layer, the surface of the dark print layer facing the transparent resin layer, and the surface of the transparent resin layer facing the dark print layer. If such a smooth surface is provided, it is possible to reflect most of the light without involving diffusion, and hence the light transmitted to the interior of the base sheet is not easily allowed to enter the dark print layer. Further, it is possible to reduce the absorption of light by the dark print layer. Thus, if the dark print layer is added to the base sheet, the light transmitted to the interior of the base sheet is not easily absorbed by the dark print layer, thus mitigating the reduction in illumination luminance.

The transparent resin layer may be formed by curing a coating liquid non-corrosive to the base sheet. The transparent resin layer is formed by curing a coating liquid non-corrosive to the base sheet, and hence it is possible for the surface of the base sheet to be maintained as a smooth surface without being roughened as a result of the formation of the transparent resin layer. Further, if there is provided a dark print layer formed of a solvent type coating liquid corrosive to the transparent resin layer, the surface of the base sheet facing the transparent resin layer is a smooth surface, and hence it is possible for a smooth surface to exist between the base sheet and the dark print layer, making it hard for the light transmitted to the interior of the base sheet to enter the dark print layer.

When a solvent type coating liquid corrosive to the base sheet is used, the coating liquid corrodes the surface of the base sheet when the coating liquid is applied to the base sheet, and hence the interface between the base sheet and the transparent resin layer cannot be maintained smooth. In contrast, when a non-corrosive coating liquid is used, the surface of the base sheet is not corroded, and the interface between the base sheet and the transparent resin layer, that is, both the surface of the transparent resin layer facing the base sheet, and the surface of the base sheet facing the transparent resin layer can be maintained smooth.

More specifically, the transparent resin layer may be formed by curing a non-solvent type coating liquid, an aqueous solvent type coating liquid, or an alcoholic solvent type coating liquid non-corrosive to the base sheet. When the transparent resin layer is formed by curing an ultraviolet curing or thermosetting non-solvent type coating liquid non-corrosive to the base sheet, or by curing an aqueous or alcoholic solvent type non-corrosive coating liquid, it is possible to maintain the surface of the base sheet smooth. Further, it is desirable for the coating liquid to be of an ultraviolet curing type, thermosetting type, or the like.

Further, it is possible to form the transparent resin layer by curing an ultraviolet curing urethane acrylate-based ink or by curing a thermosetting urethane-based ink. The transparent resin layer is formed by curing an ultraviolet curing urethane acrylate-based ink or by curing a thermosetting urethane-based ink, and hence it is possible to maintain the surface of the base sheet smooth without corroding the same. Further, it is possible to form the surface of the transparent resin layer as a smooth surface.

The surface of the base sheet facing the transparent resin layer can be a smooth surface. The surface of the base sheet facing the transparent resin layer is a smooth surface, and hence it is possible to make it hard for the light guided through the base sheet to enter the transparent resin layer side. Thus, light leakage from the base sheet is not likely to occur, and the amount of light guided through the base sheet is not easily reduced.

It is also possible to use a dark print layer corroding the transparent resin layer, thus making it possible to widen the selection range for the dark print layer coating liquid. The interface between the base sheet and the transparent resin layer is already a smooth surface, and hence, when the interface between the transparent resin layer and the dark print layer is formed as a rough surface, it is possible to guide light efficiently through the base sheet.

It is possible for the transparent resin layer to have a refractive index different from that of the base sheet. When the refractive index differs, the light reflectance is enhanced, and hence light does not easily enter the transparent resin layer from the base sheet. In particular, it is possible to make the refractive index of the transparent resin layer lower than that of the base sheet. When the refractive index of the transparent resin layer is lower than that of the base sheet, it is possible to enlarge the critical angle of the total reflection at the surface of the base sheet, making it possible to reduce the quantity of light entering the transparent resin layer from the base sheet. Thus, it is possible to propagate light efficiently through the base sheet.

The dark print layer can be formed by curing a coating liquid non-corrosive to the transparent resin layer. This makes it possible to prevent the transparent resin layer from being corroded at the time of application of the dark print layer, making it possible to form the interface between the transparent resin layer and the dark print layer, that is, both the surface of the dark print layer facing the transparent resin layer, and the surface of the transparent resin layer facing the dark print layer as smooth surfaces.

The surface of the transparent resin layer facing the dark print layer can be formed as a smooth surface. In this case, if the light transmitted through the base sheet is allowed to enter the transparent resin layer, the light is not easily allowed to enter the dark print layer. Thus, it is possible to prevent light from being absorbed by the dark print layer.

Further, according to the present invention, there is provided a key sheet which allows illumination and includes a base sheet formed of a transparent resin film, and at least one depressing operation portion provided on an operation surface side of the base sheet, in which the base sheet is a light guiding sheet, and in which a dark print layer shielding light is provided on at least one surface of the base sheet, with a smooth surface being provided between the base sheet and the dark print layer.

That is, it is possible to adopt a construction formed by removing the transparent resin layer from the key sheet described above. As in the case of the above-mentioned key sheet, also in this construction, there is provided a smooth surface between the base sheet and the dark print layer, that is, the surface of the base sheet facing the dark print layer is formed as a smooth surface, and hence the light propagated through the base sheet is not easily allowed to enter the dark print layer. As a result, it is possible to prevent light from being absorbed by the dark print layer.

It is possible for the dark print layer to be formed by curing a coating liquid non-corrosive to the base sheet. The dark print layer is formed by curing a coating liquid non-corrosive to the base sheet, and hence the surface of the base sheet can be maintained as a smooth surface without being roughened due to the formation of the dark print layer. More specifically, the dark print layer may be formed by curing a non-solvent type coating liquid non-corrosive to the base sheet, or by curing an aqueous or alcoholic non-corrosive solvent type coating liquid. When the dark print layer is formed by curing a non-solvent type coating liquid non-corrosive to the base sheet, or by curing an aqueous or alcoholic non-corrosive solvent type coating liquid, it is possible to maintain the surface of the base sheet as a smooth surface.

When a section of the base sheet is observed, this smooth surface makes it possible to observe how the light entering the section on the opposite side of the section being observed is brightly reflected. On the other hand, when the dark print layer is formed of an corrosive coating liquid to form a rough surface (non-smooth surface), the entire of the key sheet is dark as if being frosted, and it is possible to observe how diffusion reflection is effected.

It is possible for the dark print layer to have a refractive index smaller than that of the base sheet or the transparent resin layer held in contact with this dark print layer. This make it possible to enlarge the critical angle of the total reflection at the surface held in contact with the dark print layer, making it possible to reduce the quantity of light allowed to enter the dark print layer. Thus, it is possible to prevent light from being absorbed by the dark print layer.

In this key sheet, it is possible to provide, on at least one surface of the base sheet, diffusion portions formed through roughening the surface of the opposing base sheet, and transmitting the light propagated in the surface direction of the base sheet to the depressing operation portions.

Due to the provision of the diffusion portions, it is possible to diffuse the light propagated in the surface direction of the base sheet by the diffusion portions and to illuminate the depressing operation portions. The diffusion portions allow dotted dispersion arrangement. When the diffusion portions are arranged in a dotted, dispersed fashion, it is possible to adjust as appropriate the size and configuration of each diffusion portion and the interval between the diffusion portions, making it possible to adjust the illumination luminance for each depressing operation portion.

The diffusion portions are formed by, for example, printing of a resin ink to which a filler of high refractive index, a filler of high light reflectance, etc. are added. Usually at the time of the formation of the diffusion portions, the surface of the base sheet constituting the fixation surface for the diffusion portions is corroded to form a rough surface, and hence it is possible to illuminate the depressing operation portions through outflow of light entering from the base sheet through the diffusion portions.

In the construction of the present invention in which a smooth surface is provided between the base sheet and the dark layer, such diffusion portions make it possible to transmit light to the depressing operation portions with particularly high effectiveness.

The dispersion configuration of the diffusion portions may form display elements. In the prior art, display elements such as characters and symbols formed by printing on the depressing operation portions are illuminated by backlight, facilitating visual recognition of the display elements by utilizing a difference in transmission light quantity and a difference in tone of color in the display elements. In contrast, due to the formation of the display elements through the dispersion configuration of the diffusion portions, it is possible to visually recognize the display elements without having to separately form display elements on the depressing operation portions. Further, unlike the display elements formed by print layers, the display elements formed by the diffusion portions can realize a novel design in which the radiated light itself forms the display elements.

The diffusion portions may be provided so as to be covered with the transparent resin layer. The transparent resin layer covers the diffusion portions, and hence it is possible to prevent the diffusion portions and the dark print layer from coming into contact with each other, making it hard for the light reflected by the diffusion portions to enter the dark print layer.

Further, according to the present invention, there is provided a lightproof light guiding sheet in which a transparent resin layer is provided on at least one surface of a light guiding sheet and in which a dark print layer shielding light is provided on the surface of the transparent resin layer, with a smooth surface being provided between the light guiding sheet and the dark print layer.

The dark print layer shielding light is provided on at least one surface of the light guiding sheet through the intermediation of the transparent resin layer, and hence it is possible to prevent light entering from the exterior of the light guiding sheet from being transmitted through the light guiding sheet in the thickness direction thereof to be emitted toward the surface on the opposite side. Thus, it is possible to use the light guiding sheet as the base sheet of an illumination type key sheet.

Further, due to the provision of a smooth surface between the base sheet and the dark print layer, the light propagated through the interior of the base sheet is not easily allowed to enter the dark print layer. Thus, it is possible to reflect most of the light within the lightproof light guiding sheet and to transmit the light in the surface direction thereof without diffusing the light to the exterior of the lightproof light guiding sheet.

In this lightproof light guiding sheet, when the transparent resin layer is formed by curing a coating liquid non-corrosive to the base sheet, there is little fear of the surface of the base sheet being corroded. This transparent resin layer can be formed by applying a non-solvent type coating liquid or an aqueous or alcoholic non-corrosive solvent type coating liquid to the surface of the base sheet and curing the same thereon. Thus, it is possible to maintain the interface between the base sheet and the transparent resin layer smooth. Further, it is possible to maintain the surface of the transparent resin layer on which the dark print layer is provided as a smooth surface. This transparent resin layer can be formed by curing an ultraviolet curing urethane acrylate-based ink or by curing a thermosetting urethane-based ink.

Further, according to the present invention, there is provided a lightproof light guiding sheet including: a light guiding sheet; and a dark print layer shielding light, which is provided on at least one surface of the light guiding sheet, with a smooth surface being provided between the light guiding sheet and the dark print layer.

In another construction, due to the provision of a dark print layer shielding light on at least one surface of the light guiding sheet, it is possible to prevent the light entering from the exterior of the light guiding sheet from being transmitted in the thickness direction of the light guiding sheet and emitted toward the surface on the opposite side. Thus, it is possible to use the light guiding sheet as the base sheet of an illumination type key sheet.

Further, due to the provision of a smooth surface between the base sheet and the dark print layer, it is possible to make it hard for the light transmitted to the interior of the base sheet to enter the dark print layer. Thus, no light is diffused to the exterior of the lightproof light guiding sheet, and it is possible to cause most of the light to be reflected within the lightproof light guiding sheet and to transmit the same in the surface direction thereof.

Regarding another lightproof light guiding sheet, when the dark print layer is formed by curing a coating liquid non-corrosive to the base sheet, there is little fear of the surface of the base sheet being corroded. This dark print layer can be formed by applying a non-solvent type coating liquid or an aqueous or alcoholic non-corrosive solvent type coating liquid to the surface of the base sheet and curing the same thereon. Thus, it is possible to maintain the interface between the base sheet and the dark print layer smooth. This dark print layer can be formed by curing an ultraviolet curing urethane acrylate-based ink or a thermosetting urethane-based ink.

According to the present invention, there is further provided a pushbutton switch including: a key sheet that allows illumination and includes a base sheet formed of a transparent resin film and at least one depressing operation portion provided on an operation surface side of the base sheet; and a circuit board including a contact switch and an inner light source, in which the base sheet is a light guiding sheet, in which a transparent resin layer is provided on at least one surface of the base sheet, and in which there is further provided on the surface of the transparent resin layer a dark print layer shielding light, with a smooth surface being provided between the base sheet and the dark print layer.

Further, according to the present invention, there is provided a pushbutton switch including: a key sheet that allows illumination and includes a base sheet formed of a transparent resin film and at least one depressing operation portion provided on an operation surface side of the base sheet; and a circuit board including a contact switch and an inner light source, in which the base sheet is a light guiding sheet, and in which a dark print layer shielding light is provided on at least one surface of the base sheet, with a smooth surface being provided between the base sheet and the dark print layer.

Those pushbutton switches employ the lightproof light guiding sheet and the key sheet as mentioned above, and hence it is possible to make it difficult for the light transmitted to the interior of the base sheet to enter the dark print layer. Thus, no light is diffused to the exterior of the lightproof light guiding sheet, and it is possible to reflect most of the light within the lightproof light guiding sheet and to transmit the same in the surface direction thereof.

Further, it is possible to prevent the light entering from the exterior of the key sheet from being transmitted through the key sheet. That is, it is possible to provide a pushbutton switch whose key sheet has a dark print layer on at least one surface of a base sheet and in which the dark print layer covers a gap between depressing operation portions on the base sheet.

It is possible for the key sheet to have a dark print layer on a front surface side of the base sheet, with the dark print layer covering the gap between the depressing operation portions on the base sheet. In this construction, it is possible to prevent light leakage from the pushbutton switch.

Further, according to the present invention, there is provided a key sheet manufacturing method of manufacturing a key sheet that allows illumination and includes a base sheet formed of a transparent resin film and at least one depressing operation portion provided on an operation surface side of the base sheet, in which the base sheet is a light guiding sheet, in which a coating liquid non-corrosive to the base sheet is applied to at least one surface of the base sheet and cured thereon so as to provide a transparent resin layer, and in which a dark print layer shielding light is provided by printing on a surface of the transparent resin layer, with a smooth surface being provided between the base sheet and the dark print layer.

A coating liquid non-corrosive to the base sheet is applied to at least one surface of the base sheet and cured thereon so as to provide a base sheet whose surface is smooth, and hence it is possible to manufacture a key sheet involving little light leakage from the base sheet to the transparent resin layer.

Further, a dark print layer shielding light is provided on the surface of the transparent resin layer by printing, and hence it is possible to provide a key sheet having a smooth surface between the base sheet and the dark print layer, making it possible to obtain a key sheet in which no light is absorbed in the dark print layer and which is superior in light guiding property.

Further, there is provided a key sheet manufacturing method of manufacturing a key sheet that allows illumination and includes a base sheet formed of a transparent resin film and at least one depressing operation portion provided on an operation surface side of the base sheet, in which the base sheet is a light guiding sheet, and in which a dark print layer shielding light is provided on at least one surface of the base sheet by applying to the base sheet a coating liquid non-corrosive to the base sheet and curing the same thereon, with a smooth surface being provided between the base sheet and the dark print layer.

The dark print layer is provided by using a coating liquid non-corrosive to the base sheet, and hence it is possible to provide a key sheet having a smooth surface between the base sheet and the dark print layer. That is, it is possible to form the surface of the base sheet facing the dark print layer as a smooth surface, making it possible to manufacture a key sheet involving little light leakage from the base sheet to the dark print layer and superior in light guiding property.

In the key sheet and the pushbutton switch of the present invention, light leakage does not easily occur at the dark print layer, making it possible to make it hard for light that has undergone diffused reflection to leak from the intervals between the depressing operation portions.

Further, according to the key sheet manufacturing method of the present invention, it is possible to manufacture a key sheet which is little subject to light leakage through the dark print layer.

Further, in the lightproof light guiding sheet of the present invention, light entering from the exterior of the light guiding sheet is not easily allowed to be transmitted through the light guiding sheet in the thickness direction thereof to be transmitted to the surface on the opposite side.

The above description of the present invention should not be construed restrictively, and the advantages, features, and uses of the present invention become more apparent from the following description given with reference to the accompanying drawings. Further, it should be understood that all the modifications made without departing from the gist of the present invention are to be covered by the scope of the present invention.

DETAILED DESCRIPTION OF THE PREFERRED EMBODIMENTS

Figure 1:
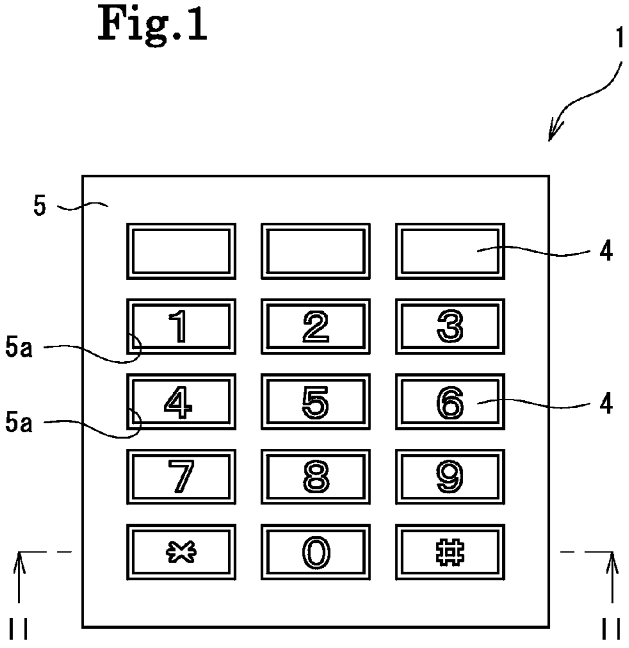
FIG. 1 is a plan view of a key sheet according to a first embodiment.

Embodiments of the present invention are described with reference to the drawings. In the drawings, the reference numerals indicate portions and components. The components common to the embodiments are indicated by the same reference numerals, and a redundant description thereof is omitted.

First Embodiment

FIGS. 1 through 4

Figure 2:
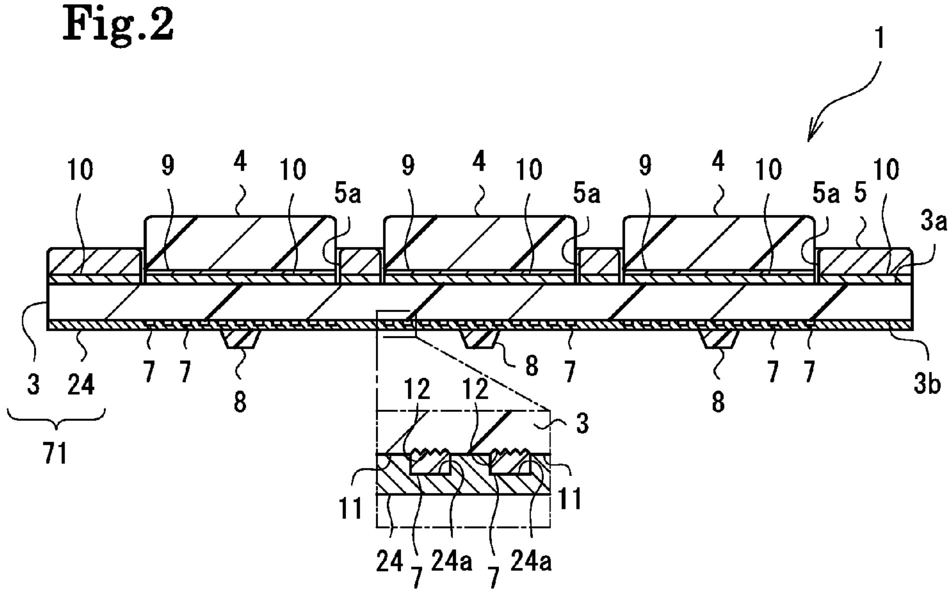
FIG. 2 is a sectional view taken along the line II-II of FIG. 1.
Figure 3:
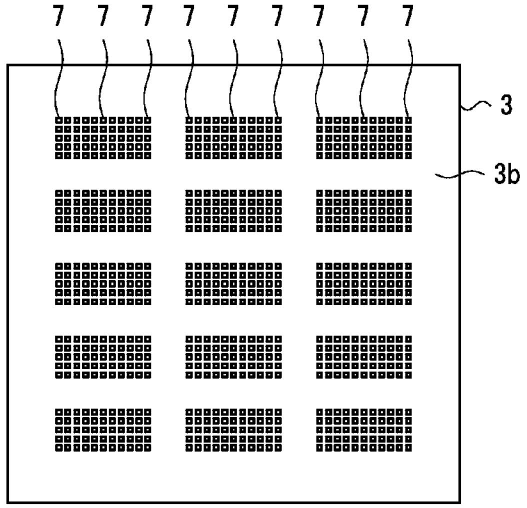
FIG. 3 is a bottom view of a base sheet used in the key sheet according to the first embodiment.
Figure 4:
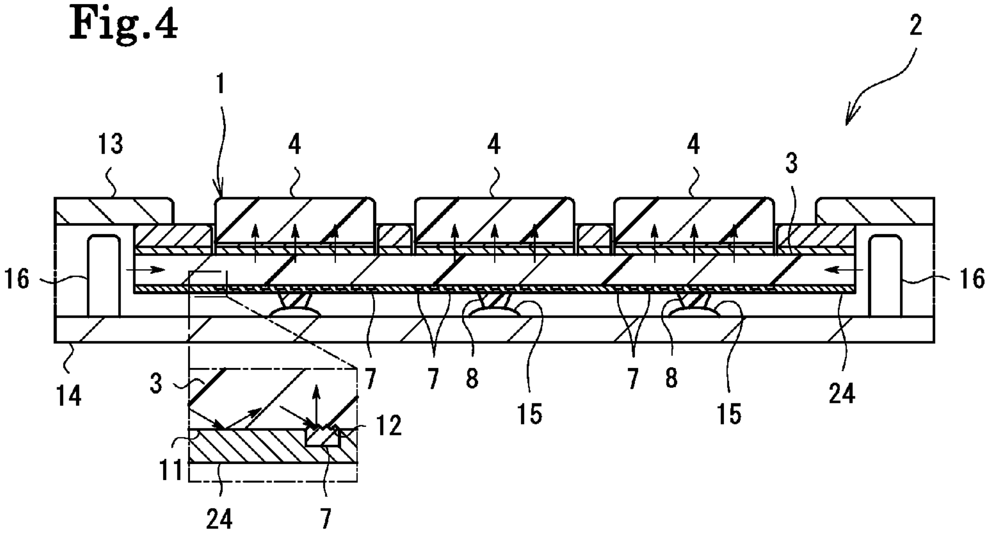
FIG. 4 is an enlarged sectional view of a pushbutton switch to which the key sheet according to the first embodiment is mounted.

FIGS. 1 through 3 illustrate a key sheet 1 according to this embodiment, and FIG. 4 illustrates a pushbutton switch 2 according to this embodiment. FIG. 1 is a plan view of the key sheet 1, FIG. 2 is a sectional view of the key sheet 1 taken along the line II-II, FIG. 3 is a bottom view of a base sheet 3 used in the key sheet 1, and FIG. 4 is an enlarged sectional view of the pushbutton switch 2 to which the key sheet 1 is mounted. The key sheet 1 according to this embodiment is provided with the base sheet 3, key tops 4, a top cover 5, a dark print layer 24, diffusion portions 7, and pushers 8.

The base sheet 3 is formed of a transparent resin film, and is a member constituting the base member of the key sheet 1. Further, the transparent base sheet 3 also serves as a "light guiding sheet" transmitting light in the surface direction thereof.

As the material for the resin film used in the base sheet 3, a thermoplastic resin having high transparency is used. Examples thereof include a polycarbonate resin, an acrylic resin, a urethane resin, and a polyethylene terephthalate resin. Of those, a polycarbonate resin, a polymethyl methacrylate resin, an acrylic resin, and a urethane resin, which have no wavelength absorbing area in a visible light region and have high transparency are desirable.

The surface of the base sheet 3 is formed as a flat and transparent smooth surface. Such a smooth surface appears to be transparent, with no embossing being effected thereon.

It is desirable for the thickness of the base sheet 3 to be 30 μm to 500 μm. When the thickness is less than 30 μm, the base sheet 3 is rather thin, and hence the quantity of light transmitted to the interior of the base sheet 3 is small, resulting in a low illumination luminance of the key sheet 1. If the thickness exceeds 500 μm, the quantity of light entering the base sheet from the inner light source can scarcely be increased. Further, due to the high rigidity, the depression load of the key sheet 1 increases, resulting in a rather poor operability.

The key tops 4 are formed of transparent resin in a rectangular configuration in plan view. The key tops 4 constitute the "depressing operation portions" of the key sheet 1, and print layers 9 representing display elements are formed on the back surfaces of the key tops on the side opposite to the top surfaces thereof constituting the depressing surfaces of the key tops 4. The key tops 4 are fixed to a front surface 3*a* constituting the operation surface side of the base sheet 3 side by side with the top cover 5 described below by means of adhesion layers 10.

As the material for the resin used in the key tops 4, a thermoplastic resin and a reactive hardening resin, which have high transparency, may be used. Examples thereof include a polycarbonate resin, an acrylic resin, a urethane resin, a polyethylene terephthalate resin, an epoxy resin, and a silicone resin.

Regarding the adhesion layers 10, as long as at least those for fixing the key tops 4 are formed as light transmitting layers, it is possible to effect back light illumination on the key tops 4.

The top cover 5 is formed of resin in a lattice-like configuration in plan view with rectangular through-holes 5*a*. The above-mentioned key tops 4 are exposed through the through-holes 5*a*. That is, the top cover 5 is provided so as to cover the intervals between the key tops 4 and the outer periphery of the group of key tops 4 with respect to the front surface 3*a* of the base sheet 3.

As the material for the resin used in the top cover 5, a thermoplastic resin is used. Examples thereof include a polyethylene resin, a polypropylene resin, a polystyrene resin, a polycarbonate resin, a polyethylene terephthlate resin, a polybutylene terephthalate resin, an acrylic resin, a polyamide resin, a polyurethane resin, and an acrylonitrile-butadiene-styrene copolymer resin.

The dark print layer 24 is formed of a resin coating film, and is a layer of a dark color such as black or dark blue through which light is not easily transmitted. The dark print layer 24 is fixed to a smooth surface 11 of a back surface 3*b* of the base sheet 3. Further, there are provided recesses 24*a* filled with the diffusion portions 7.

As the material of the dark print layer 24, there is used a non-corrosive liquid such as a coating material or an ink, which is non-corrosive to the base sheet 3. If an ink or a coating material containing solvent corrosive to the base sheet 3 is used, there is a fear of the surface of the base sheet 3 being roughened. Specific examples of the coating liquid non-corrosive to the base sheet 3 include non-solvent type urethane-based ink, water or alcohol based curable ink, and EB curing ink.

When the dark print layer 24 is formed by printing on the back surface 3*b* of the base sheet 3 as in the case of this embodiment, it is desirable for the dark print layer 24 to be formed of a resin whose refractive index is smaller than that of the resin forming the base sheet 3.

It is desirable for the thickness of the dark print layer 24 to be 5 μm to 50 μm. If the thickness is less than 5 μm, the effect of shielding light from the outside deteriorates, whereas, if the thickness exceeds 50 μm, the effect of shielding light from the outside remains the same.

As described above, in the key sheet 1 of this embodiment, the base sheet 3, which is a "light guiding sheet," and the dark print layer 24 form a lightproof light guiding sheet 71, with the smooth surface 11 provided therebetween.

The diffusion portions 7 are formed of resin coating films to which a filler of high refractive index and high light reflectance, etc. are added. The diffusion portions 7 change the light reflecting direction to change the path of the light. The diffusion portions 7 are fixed to the rough surfaces 12 on the back surface 3*b* of the base sheet 3. As illustrated in FIG. 3, the diffusion portions 7 are arranged in a dot-like dispersed fashion in correspondence with the configuration of the key tops 4. That is, the diffusion portions 7 transmit light propagated in the surface direction of the base sheet to the key tops 4.

As the material for the resin used in the diffusion portions 7, a resin that can be printed on the base sheet 3 to form the diffusion portions 7 is used. Examples thereof include a polycarbonate resin, an acrylic resin, a urethane resin, a polyethylene terephthalate resin, a vinyl chloride resin, an ester resin, and an epoxy resin. In addition, as the filler having high refractive index and the filler having high light reflectance, titanium oxide is exemplified.

In this embodiment, in forming the diffusion portions 7 on the back surface 3*b* of the base sheet 3 by printing, the fixation surfaces on the base sheet 3 are roughened by the solvent contained in the ink.

The thickness of the diffusion portions 7 may be 5 μm to 30 μm.

The pushers 8 are formed of resin, and are members for depressing contact switches on a circuit board provided on the back surface side of the key sheet 1. The pushers 8 are provided on the back surface of the dark print layer 24 in correspondence with the key tops 4.

As the material for the resin used in the pushers 8, in view of performance requirements for mechanical strength, durability, and weight reduction, a hard resin is desirable out of a thermoplastic resin, a thermosetting resin, a photo-curing resin, and the like. Examples thereof include an acrylate resin, a polycarbonate resin, a polyethylene terephthalate resin, an acrylic resin, a polypropylene resin, a polystyrene resin, a polyacrylic copolymer resin, a polyolefin resin, an acrylonitrile butadiene styrene resin, a polyester resin, an epoxy resin, a polyurethane resin, a polyamide resin, and a silicone resin. As the photo-curing resin, the kind of a UV curing-type, a visible light-type, an electron beam-type, and the like are desirable.

Next, the method of manufacturing the key sheet 1 is described.

First, the key tops 4 having the print layers 9 on the back surfaces and the top cover 5 are fixed to the front surface 3*a* of the base sheet 3 by means of the adhesion layers 10. Next, the diffusion portions 7 are formed on the back surface 3*b* of the base sheet 3 by printing, and then the dark print layer 24 is formed on the entire back surface 3*b* of the base sheet 3 covering the diffusion portions 7 by using an ink non-corrosive to the base sheet 3. Finally, the pushers 8 are provided on the back surface of the dark print layer 24 to thereby obtain the key sheet 1.

The key sheet 1 according to this embodiment is mounted in a casing 13 together with a circuit board 14 to thereby form the pushbutton switch device 2.

As illustrated in FIG. 4, the key sheet 1 is fixed in position inside the casing 13 such that the pushers 8 are held in contact with metal domes 15 as the "contact switches" on the circuit board 14. The outer edge of the key sheet 1 is opposed to an LED 16 serving as the "inner light source" arranged on the circuit board 14.

Further, when the LED 16 emits light, the light enters from the outer edge of the base sheet 3 as indicated by arrows, and is propagated in the surface direction inside the base sheet 3. Then, the path of the light propagated in the surface direction is shifted toward the key tops 4 by the diffusion portions 7, thereby illuminating the key tops 4.

While in the key sheet 1 according to this embodiment the light from the LED 16 is taken in from the outer edge of the base sheet 3, when a through-hole is provided in the base sheet and the LED is arranged in the through-hole, the light from the LED can be taken in from the inner edge.

In the key sheet 1 and the pushbutton switch 2 according to this embodiment, the base sheet 3 is formed as a light guiding sheet, and hence it is possible to effect illumination by causing light to enter the base sheet 3 from the outer edge of the base sheet 3, and it is possible to provide the LED 16 at the end portion of the key sheet 1. Thus, it is possible to reduce the interval between the key sheet 1 and the circuit board 14 on which the LED is provided, making it possible to achieve a reduction in the thickness of the pushbutton switch 2.

In the lightproof light guiding sheet 71, in which the dark print layer 24 is provided on the back surface 3*b* of the base sheet 3, it is possible to make it hard for the light that has undergone diffused reflection between the key sheet 1 and the circuit board 14 to leak toward the operation surface of the key sheet 1 due to the dark print layer 24. Thus, it is possible to make it hard for the light that has undergone diffused reflection between the key sheet 3 and the circuit board 14 to leak from between the key tops 4.

Further, the dark print layer 24 is formed by curing a coating liquid non-corrosive to the base sheet 3, and hence it is possible to maintain the back surface 3*b* of the base sheet 3 to which the dark print layer 24 is fixed as a smooth surface without roughening the same. Thus, it is possible to make it hard for the light transmitted to the interior of the base sheet 3 to enter the dark print layer 24 due to the smooth surface 11, making it substantially possible to avoid light adsorption by the dark print layer 24. Thus, if the dark print layer 24 is provided on the base sheet 3, the quantity of light transmitted into the interior of the base sheet 3 is not easily decreased, and hence the illumination luminance of the pushbutton switch 2 is not easily decreased.

Further, when the dark print layer 24 is formed of a resin whose refractive index is smaller than that of the base sheet 3, it is possible to enlarge the critical angle of the total reflection at the back surface 3*b* of the base sheet 3, making it possible to reduce the quantity of light entering the dark print layer 24. Thus, it is possible to make it hard to reduce the quantity of light propagated through the base sheet, making it hard for the illumination luminance of the pushbutton switch 2 to be reduced.

Due to the provision of the diffusion portions 7 on the back surface 3*b* of the base sheet 3, it is possible to illuminate the key tops 4 with the light transmitted in the surface direction of the base sheet 3. Further, the fixation surfaces of the key sheet 3 fixed to the diffusion portion 7 are the rough surfaces 12, and hence it is possible to enhance the illumination luminance of the key tops 4 due to the diffusion portions 7.

Since the pushers 8 are provided on the back surface of the dark print layer 24, it is possible to reliably depress the metal domes 15 at the time of depressing operation, and it is possible to mask the pushers 8 with the dark print layer 24 at the time of back light illumination.

Second Embodiment

Figure 5:
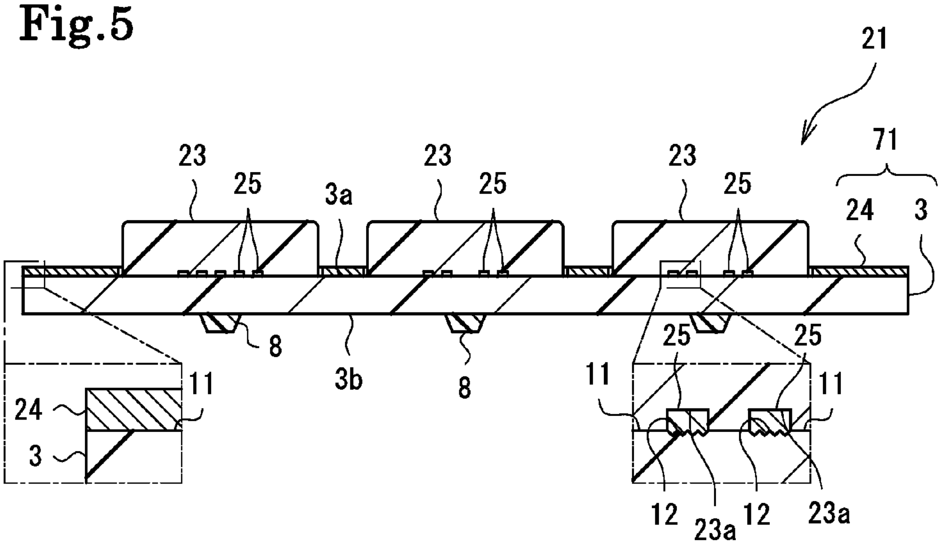
FIG. 5 is a sectional view, corresponding to FIG. 2, of a key sheet according to a second embodiment.
Figure 6:
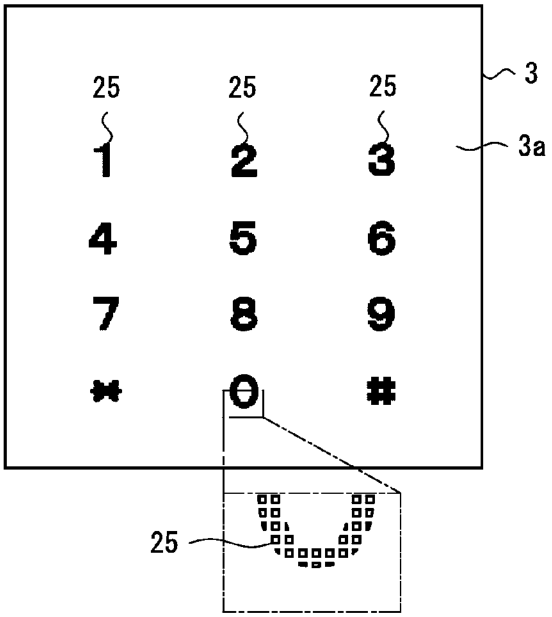
FIG. 6 is a plan view of a base sheet used in the key sheet according to the second embodiment.
Figure 7:
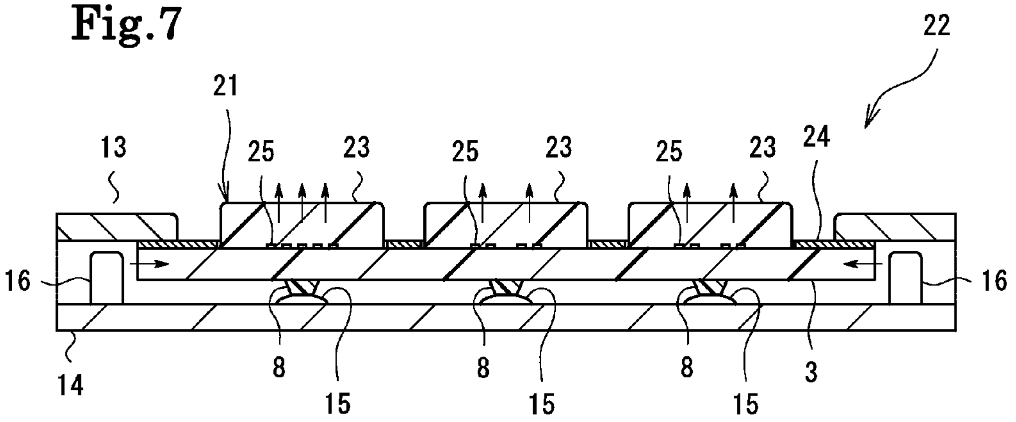
FIG. 7 is an enlarged sectional view of a pushbutton switch to which the key sheet according to the second embodiment is mounted.

FIGS. 5 through 7

FIGS. 5 and 6 illustrate a key sheet 21 according to this embodiment, and FIG. 7 illustrates a pushbutton switch 22 according to this embodiment. FIG. 5 is a sectional view of the key sheet 21, FIG. 6 is a plan view of the base sheet (light guiding sheet) 3 used in the key sheet 21, and FIG. 7 is an enlarged sectional view of the pushbutton switch 22 to which the key sheet 21 is mounted. The key sheet 21 differs from the key sheet 1 according to the first embodiment in the construction of key tops 23, a dark print layer 24, and diffusion portions 25, and no top cover is provided to the key sheet 21. The construction of the other members and the effects thereof are the same as those of the first embodiment.

The key tops 23 are formed by curing a transparent liquid resin. Like the key tops 4, the key tops 23 are formed in a rectangular configuration in plan view. However, the key tops 23 have no print layers representing display elements on their back surfaces. Instead, there are provided recesses 23*a* filled with the diffusion portions 25. Further, the key tops 23 are fixed directly to the front surface 3*a* of the base sheet 3.

The dark print layer 24 is formed of a resin coating film formed of an ink non-corrosive to the base sheet 3, and is a layer of a dark color such as black or dark blue through which light is not easily transmitted. The dark print layer 24 is fixed to the smooth surface 11 of the front surface 3*a* of the base sheet 3. That is, it is provided so as to cover the intervals between the key tops 23 and the outer periphery of the group of key tops 23 with respect to the front surface 3*a* of the base sheet 3.

Also in the key sheet 21 of the second embodiment, the base sheet 3, which is a "light guiding sheet," and the dark print layer 24 form the lightproof light guiding sheet 71 having the smooth surface 11 therebetween.

The diffusion portions 25 are fixed to the rough surfaces 12 of the front surface 3*a* of the base sheet 3. Further, as illustrated in FIG. 6, the display elements are formed by dot-like dispersed configuration. That is, the light transmitted in the surface direction of the base sheet 3 is transmitted to the key tops 23 in the configurations of the display elements.

Next, the method of manufacturing the key sheet 21 is described.

First, the dark print layer 24 and the diffusion portions 25 are formed on the front surface 3*a* of the base sheet 3 by printing. Next, by using a pouring mold, the key tops 23 are formed on the front surface 3*a* of the base sheet 3. Finally, the pushers 8 are provided on the back surface 3*b* of the base sheet 3, thereby obtaining the key sheet 21.

The key sheet 21 according to this embodiment is mounted in the casing 13 together with the circuit board 14, thereby forming the pushbutton switch device 22.

As illustrated in FIG. 7, the key sheet 21 is fixed in position inside the casing 13 such that the pushers 8 are in contact with the metal domes 15 on the circuit board 14. The outer edge of the key sheet 21 is opposed to the LED 16 arranged on the circuit board 14.

When the LED 16 emits light, the light enters the base sheet 3 from the outer edge thereof as indicated by the arrows, and is propagated through the base sheet 3 in the surface direction. The path of the light, which has been propagated in the surface direction, is changed to the direction of the key tops 23, effecting illumination in the configurations of the display elements.

In the key sheet 21 and the pushbutton switch 22 according to this embodiment, the dark print layer 24 covers the intervals between the key tops 23 on the base sheet 3 and the outer periphery of the group of key tops 23, and hence the light emitted from the LED 16 and undergoing diffused reflection between the key sheet 3 and the circuit board 14 does not easily leak through the gap between the key tops 23 and through the outer periphery of the group of key tops 23.

The diffusion portions 25 are formed in the configurations of the display elements, and hence it is possible to visually recognize the display elements without having to separately forming display elements on the key tops 23. Further, unlike the display elements formed by print layers, the display elements formed by the diffusion portions 25 can realize a novel design in which the emitted light itself forms the display elements.

Third Embodiment

Figure 8:
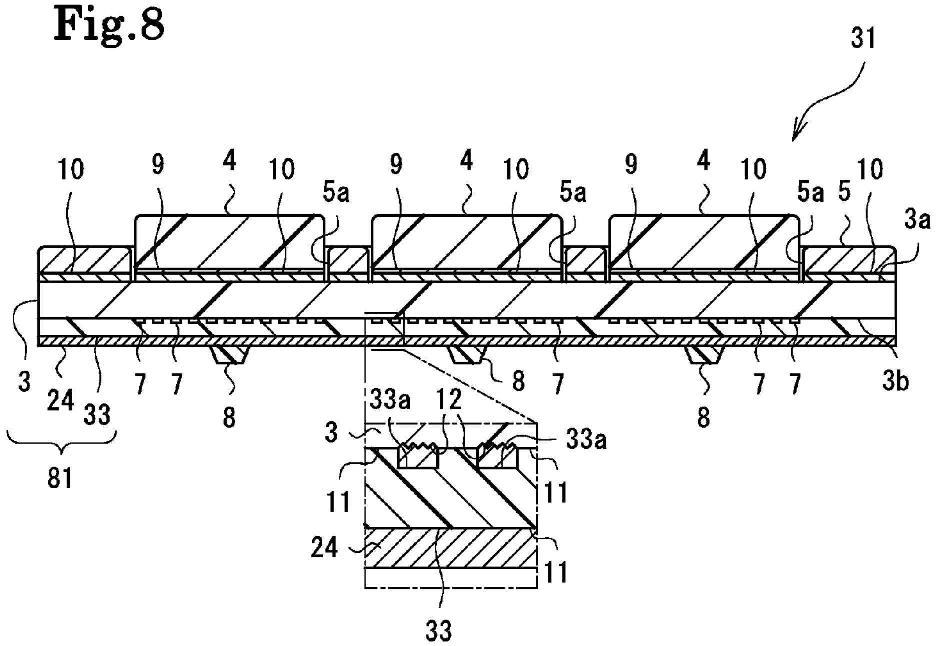
FIG. 8 is a sectional view, corresponding to FIG. 2, of a key sheet according to a third embodiment.
Figure 9:
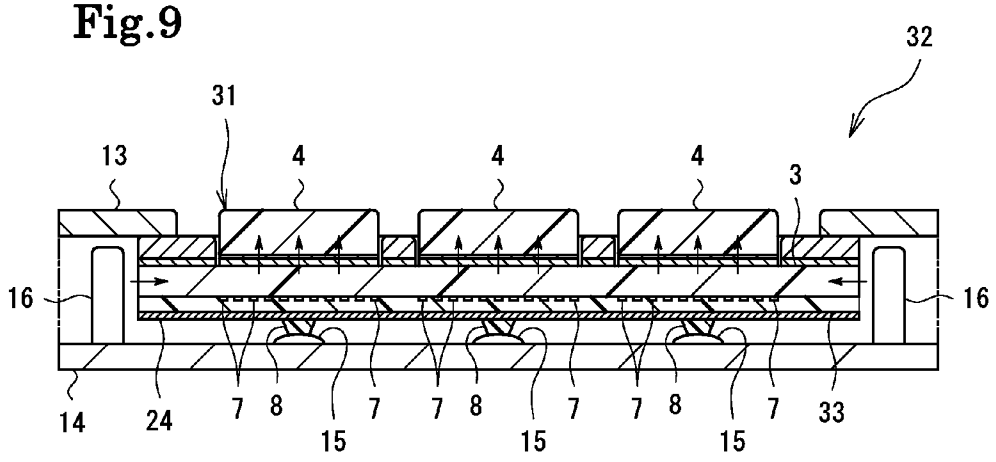
FIG. 9 is an enlarged sectional view of a pushbutton switch to which the key sheet according to the third embodiment is mounted.

FIGS. 8 through 9

FIG. 8 illustrates a key sheet 31 according to this embodiment, and FIG. 9 illustrates a pushbutton switch 32 according to this embodiment. FIG. 8 is a sectional view of the key sheet 31, and FIG. 9 is an enlarged sectional view of the pushbutton switch 32 to which the key sheet 31 is mounted. The key sheet 31 differs from the key sheet 1 according to the first embodiment in the provision of a transparent resin layer 33 and the construction of the dark print layer 24. The construction of the other members and the effects thereof are the same as those of the first embodiment.

The transparent resin layer 33 is a transparent resin coating film formed by applying a non-corrosive coating liquid such as an ink or a coating material non-corrosive to the base sheet 3. Thus, the interface between the base sheet 3 and the transparent print layer 33 is maintained smooth. The surface of the transparent print layer 33 is a flat and transparent smooth surface 11, and the smooth surface 11 also appears to be a transparent thin film without any surface irregularities. Further, the transparent print layer 33 is provided with recesses 33*a* filled with the diffusion portions 7.

As the coating liquid non-corrosive to the base sheet 3 forming the transparent resin layer 33, there is used a resin liquid of high transparency and easy to maintain smoothness. More specifically, there is used a non-solvent type cross-linked or setting resin. Examples of the resin used include an activation energy line setting ink such as a non-solvent type ultraviolet curing or EB setting ink, a water or alcohol based curable ink, and a thermosetting ink. Examples of the resin ink include an ultraviolet curing urethane acrylate-based ink and a thermosetting urethane-based ink. By forming the transparent resin layer 33 of a cross-linked or setting ink, it is possible to make the transparent resin layer 33 less subject to corrosion by the dark print layer 24 as compared with the base sheet 3.

It is desirable for the thickness of the transparent resin layer 33 to be 5 μm to 200 μm. When the thickness is less than 5 μm, the diffusion effect cannot be sufficiently exerted. If it is more than 200 μm, the smooth surface forming effect remains the same. Rather, that would lead to an increase in the thickness of the key sheet 31. More preferably, the thickness ranges from 5 μm to 30 μm.

The dark print layer 24 is a layer of a dark color such as black or dark blue through which light is not easily transmitted. It is formed through application of a non-corrosive coating liquid such as an ink or a coating material non-corrosive to the transparent resin layer 33, and is fixed to the smooth surface 11 of the transparent resin layer 33.

When the dark print layer 24 is formed on the transparent resin layer 33 by printing as in the case of this embodiment, it is desirable for the dark print layer 24 to be formed of a resin whose refractive index is smaller than that of the transparent resin layer 33.

In the key sheet 31 of the third embodiment, the base sheet 3, which is a "light guiding sheet", the dark print layer 24, and the transparent resin layer 33 form a lightproof light guiding sheet 81 having the smooth surface 11 between the base sheet 3 and the dark print layer 24.

Next, the method of manufacturing the key sheet 31 is described.

First, the key tops 4 having the print layers 9 on the back surfaces thereof and the top cover 5 are fixed to the front surface 3*a* of the base sheet 3 by means of the adhesion layers 10. Next, the diffusion portions 7 are formed on the back surface 3*b* of the base sheet 3 by printing, and then the transparent resin layer 33 is formed by printing on the entire back surface 3*b* of the base sheet 3 covering the diffusion portions 7. Then, the dark print layer 24 is formed by printing on the back surface of the transparent resin layer 33. Finally, the pushers 8 are provided on the back surface of the dark print layer 24, thereby obtaining the key sheet 31.

The key sheet 31 of this embodiment is mounted in the casing 13 together with the circuit board 14 to thereby form a pushbutton switch 32.

As illustrated in FIG. 9, the key sheet 31 is fixed in position inside the casing 13 such that the pushers 8 are held in contact with the metal domes 15 on the circuit board 14. The outer edge of the key sheet 31 is opposed to the LED 16 arranged on the circuit board 14.

When the LED 16 emits light, the light enters from the outer edge of the base sheet 3 as indicated by the arrows and is propagated in the surface direction through the base sheet 3. The diffusion portions 7 change the path of the light, which has been propagated in the surface direction, toward the key tops 4 to illuminate the key tops 4.

In the key sheet 31 and the pushbutton switch 32 of this embodiment, there is provided the transparent resin layer 33 between the base sheet 3 and the dark print layer 24, and the transparent resin layer 33 is formed by curing a coating liquid non-corrosive to the base sheet 3, and hence, at the time of formation of the transparent resin layer 33, it is possible to maintain the back surface 3*b* of the base sheet 3 fixed to the transparent resin layer 33 as the smooth surface 11. In this way, the fixation surface of the base sheet 3 fixed to the transparent resin layer 33 is formed as the smooth surface 11, and hence it is possible to make it hard for the light transmitted to the interior of the base sheet 3 to enter the transparent resin layer 33 due to the smooth surface 11, making it easy for the light to be transmitted through the base sheet 3 with high efficiency. Further, since dark print layer 24 is formed by curing a coating liquid non-corrosive to the transparent resin layer 33, the transparent resin layer 33 is not corroded at the time of application of the dark print layer 24, making it possible to form the fixation surface of the transparent resin layer 33 fixed to the dark print layer 24 as the smooth surface 11. Due to the lightproof light guiding sheet 81, the light propagated through the transparent resin layer 33 is hardly allowed to enter the dark print layer 24 and can be transmitted through the transparent resin layer 33, making it substantially possible to avoid light absorption by the dark print layer 24. As described above, if the dark print layer 24 is provided on the base sheet 3, it is possible to make the quantity of light propagated through the base sheet 3 small, and to make the illumination luminance of the pushbutton switch 32 less subject to reduction.

When the transparent resin layer 33 is formed of a resin whose refractive index is different from that of the base sheet 3, it is possible to enhance the reflectance of the light transmitted to the interior of the base sheet 3, making it easy for this light to enter the transparent resin layer 33. Thus, the quantity of light propagated through the base sheet 3 can be made less subject to reduction, making the illumination luminance of the pushbutton switch 32 less subject to reduction.

Since the transparent resin layer 33 is provided so as to cover the diffusion portions 7, it is possible to avoid contact of the diffusion portions 7 and the dark print layer 24, thus making it hard for the light reflected by the diffusion portions 7 to enter the dark print layer 24. Thus, the quantity of light transmitted to the key tops 4 can be made less subject to reduction, thus making the illumination luminance of the pushbutton switch 32 less subject to reduction.

First Modification of the Third Embodiment

FIG. 10

Figure 10:
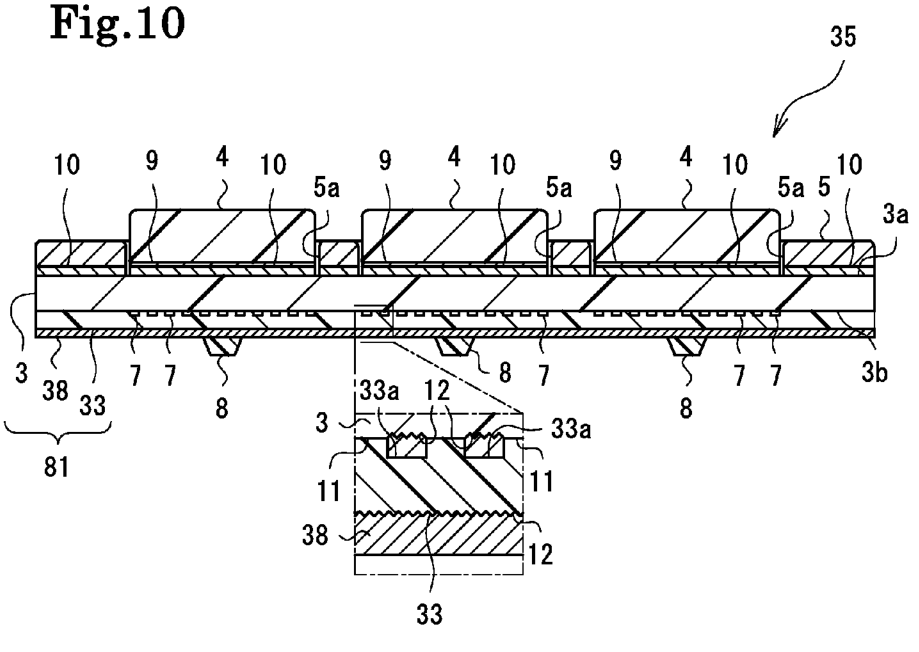
FIG. 10 is a sectional view, corresponding to FIG. 2, of a key sheet according to a first modification of the third embodiment.

FIG. 10 illustrates a key sheet 35 according to a first modification. While in the key sheet 31 of the third embodiment the interface between the transparent resin layer 33 and the dark print layer 24 and the interface between the base sheet 3 and the transparent resin layer 33 are formed as the smooth surfaces 11, it is possible for one of those interfaces to be formed as a rough surface 12.

In the key sheet 35 of this embodiment, the interface between the base sheet 3 and the transparent resin layer 33 is the smooth surface 11, whereas the interface between the transparent resin layer 33 and a dark print layer 38 is a rough surface 12.

Also in this embodiment, the fixation surface for the base sheet 3 fixed to the transparent resin layer 33 is the smooth surface 11, and hence the light transmitted through the base sheet 3 hardly enters the transparent resin layer 33. Thus, scarcely any light is transmitted up to the dark print layer 38 forming the rough surface 12. Thus, there is little influence that would cause a reduction in the illumination luminance of the key sheet 35 due to the dark print layer 38.

By using an ink or a coating material containing a solvent corrosive to the transparent resin layer 33, it is possible to form the dark print layer 38, whereby the range of selection for the kind of coating liquid forming the dark print layer 38 is widened. Thus, it is possible to provide the dark print layer 38 by using a coating liquid selected from the viewpoint of adhesion property with respect to the transparent resin layer 33, operability, price, etc., without heeding the corrosiveness with respect to the transparent resin layer 33.

As the coating liquid for the dark print layer 38, it is possible to employ a solvent type ink or the like corrosive to the transparent resin layer 33, and the selection range for the solvent is widened, and hence it is possible to use a coating liquid using a resin allowing printing on the base sheet 3. Examples of the resin allowing printing include acrylic resin, vinyl chloride resin, ester resin, urethane resin, and epoxy resin.

In the key sheet 35 of the first modification, the base sheet 3, which is a "light guiding sheet," the transparent resin layer 33, and the dark print layer 38 form a lightproof light guiding sheet 81 having the smooth surface 11 between the base sheet 3 and the dark print layer 38.

In the key sheet 35, it is desirable for the transparent resin layer 33 to be formed of a resin whose refractive index is smaller than that of the base sheet 3. This makes it possible to enlarge the critical angle of the total reflection at the fixation surface of the base sheet 3, making it possible to reduce light leakage from the base sheet 3 to the transparent resin layer 33. Thus, it is possible to transmit the light propagated through the base sheet 3 efficiently to the entire base sheet 3, making it possible to brightly illuminate the key sheet 35.

Second Modification of the Third Embodiment

FIG. 11

Figure 11:
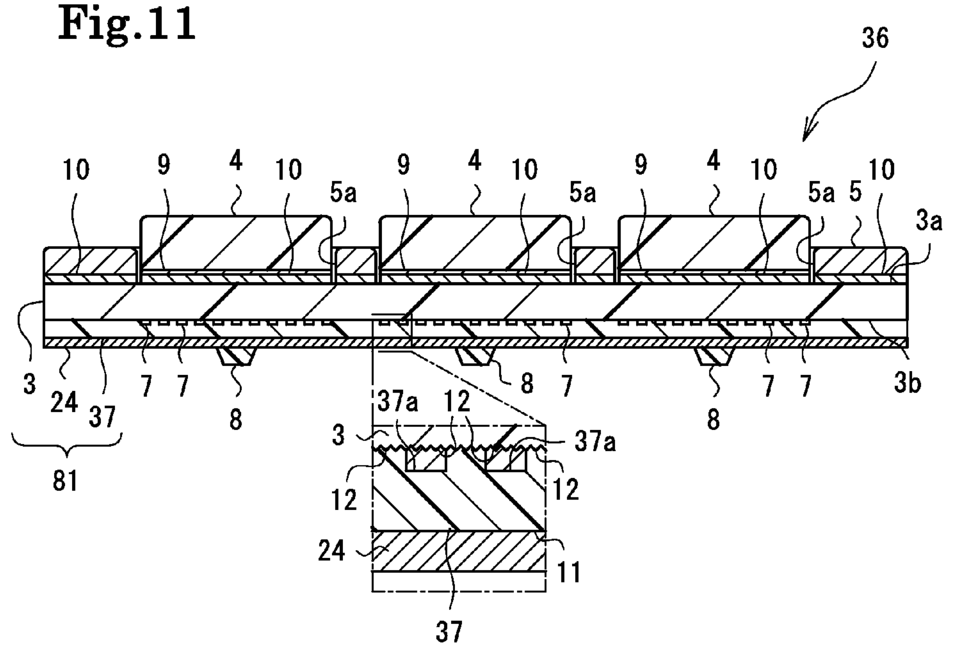
FIG. 11 is a sectional view, corresponding to FIG. 2, of a key sheet according to a second modification of the third embodiment.

FIG. 11 illustrates a key sheet 36 according to a second modification. In the key sheet 36 of this embodiment, the interface between the transparent resin layer 37 and the dark print layer 24 is the smooth surface 11, whereas the interface between the base sheet 3 and the transparent resin layer 37 is the rough surface 12.

In this embodiment, the interface between the base sheet 3 and the transparent resin layer 37 is the rough surface 12, and hence light can easily enter the transparent resin layer 37 from the base sheet 3. However, in this embodiment, the fixation surface fixing the transparent resin layer 37 and the dark print layer 24 is the smooth layer 11, and hence also the light reaching the transparent resin layer 37 hardly enters the dark print layer 24. Thus, the light transmitted to the transparent resin layer 37 is little absorbed by the dark print layer 24, and there is little influence that would cause a reduction in the illumination luminance of the key sheet 35.

As the coating liquid for forming the transparent resin layer 37, it is possible to use, unlike the case of the transparent resin layer 33 described above, a solvent type coating liquid corrosive to the base sheet 3. As such a coating liquid, it is possible to use a resin liquid obtained by dissolving polycarbonate resin, acrylic resin, urethane resin, polyethylene terephthalate resin, epoxy resin, silicone resin or the like in a solvent corrosive to the base sheet 3. It is possible to provide a transparent resin layer 33, which is easy to form with respect to the base sheet 3 and to be held in highly intimate contact therewith.

In the key sheet 36 of the second modification, the base sheet 3, which is a "light guiding sheet," the dark print layer 24 and the transparent resin layer 37 form a lightproof light guiding sheet 81 having the smooth surface 11 between the base sheet 3 and the dark print layer 24.

In the key sheet 36, it is desirable for the dark print layer 24 to be formed of a resin whose refractive index is smaller than that of the base sheet 3 or the transparent resin layer 33. This makes it possible to enlarge the critical angle of the total reflection at the surface in contact with the dark print layer 24, making it possible to reduce the quantity of light entering the dark print layer 24. Thus, it is possible to avoid light absorption by the dark print layer 24.

Fourth Embodiment

Figure 12:
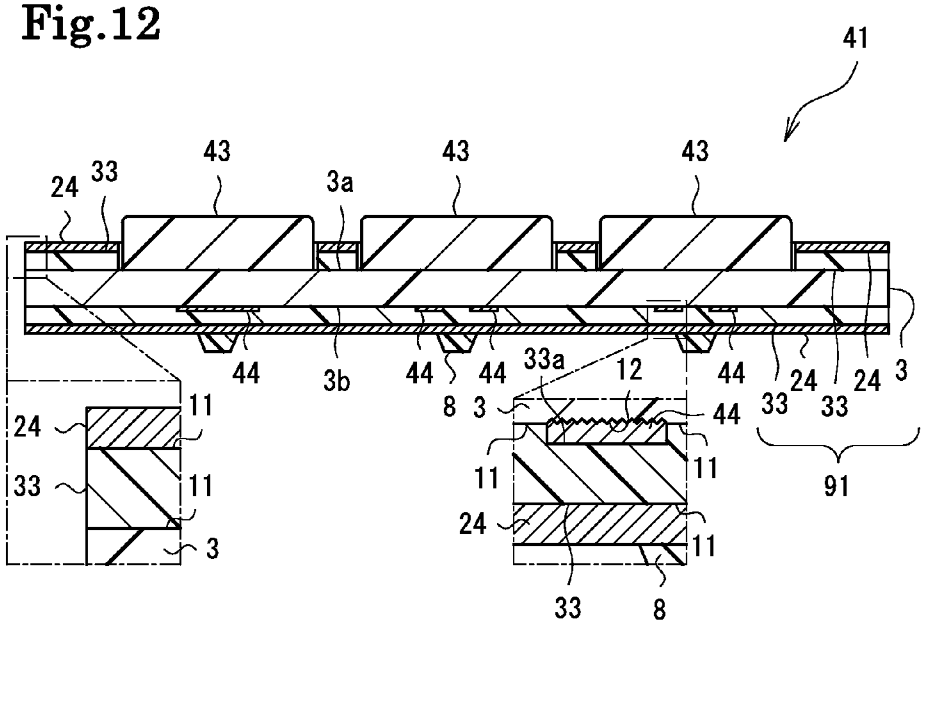
FIG. 12 is a sectional view, corresponding to FIG. 2, of a key sheet according to a fourth embodiment.
Figure 13:
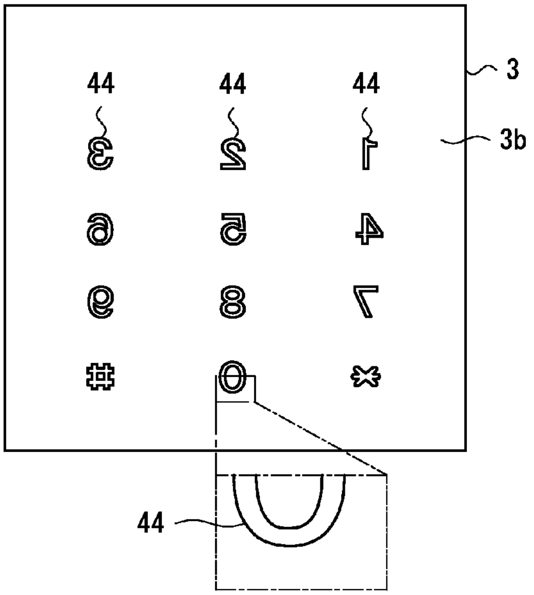
FIG. 13 is a bottom view of a base sheet used in the key sheet according to the fourth embodiment.
Figure 14:
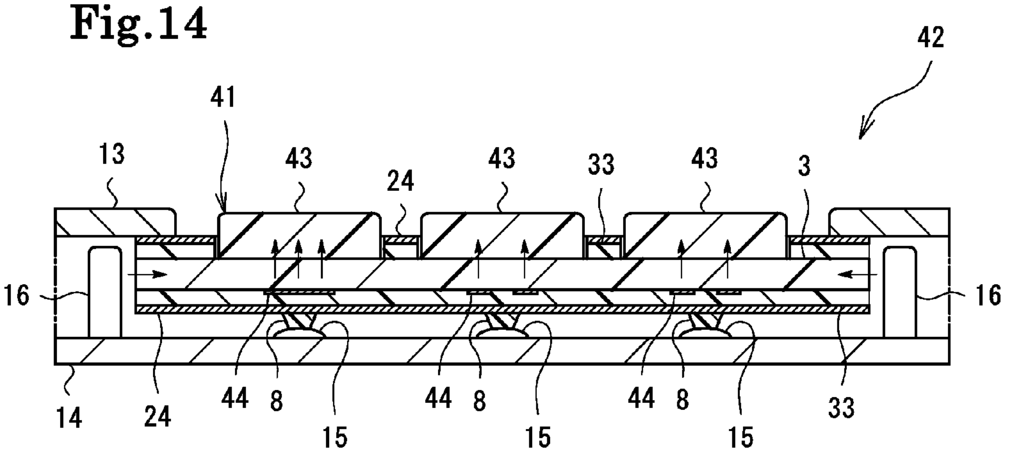
FIG. 14 is an enlarged sectional view of a pushbutton switch to which the key sheet according to the fourth embodiment is mounted.

FIGS. 12 through 14

FIGS. 12 and 13 illustrate a key sheet 41 according to this embodiment, and FIG. 14 illustrates a pushbutton switch 42 according to this embodiment. FIG. 12 is a sectional view of the key sheet 41, FIG. 13 is a bottom view of the base sheet 3 used in the key sheet 31, and FIG. 14 is an enlarged sectional view of the pushbutton switch 42 with the key sheet 41 mounted thereto. The key sheet 41 differs from the key sheet 31 of the third embodiment in that it employs key tops 43 devoid of print layers representing display elements, that there are used diffusion portions 44 formed in layers in the configurations of the display elements instead of being dispersed in a dot-like fashion, that the top cover 5 is eliminated, and that the transparent resin layer 33 and the dark print layer 24 are also provided on the operation surface side of the base sheet 3. The constructions of the other members and the effects thereof are the same as those of the above-mentioned embodiment.

The key tops 43 are formed by curing a transparent liquid resin in a rectangular configuration in plan view. Unlike the key tops 4, they have no print layers representing display elements, and are directly fixed to the front surface 3*a* of the base sheet 3.

The transparent resin layer 33 is formed of a transparent resin coating film formed by applying an ink non-corrosive to the base sheet 3, a non-corrosive coating liquid such as ink or coating material or the like, and is fixed to the smooth surface 11 of the front surface 3*a* of the base sheet 3 so as to cover the intervals between the key tops 43 and the outer periphery of the group of key tops 43.

The dark print layer 24 is formed of a resin coating film, and is a layer of a dark color such as black or dark blue through which light is not easily transmitted. It is formed by applying a non-corrosive coating liquid such as an ink or a coating material non-corrosive to the transparent resin layer 33, and is fixed to the smooth surface 11 of the transparent resin layer 33.

In the key sheet 41 of the fourth embodiment, the base sheet 3, which is a "light guiding sheet," two dark print layers 24, and two transparent resin layers 33 form a lightproof light guiding sheet 91 having the smooth surfaces 11 between the base sheet 3 and the dark print layers 24.

Next, the method of manufacturing the key sheet 41 is described.

First, the transparent resin layer 33 is formed on the front surface 3*a* of the base sheet 3 by printing. Further, the dark print layer 24 is formed on the operation surface side of the transparent resin layer 33 by printing, and then the key tops 43 are formed on the front surface 3*a* of the base sheet 3 by using a pouring mold. Next, the diffusion portions 44 are formed on the back surface 3*b* of the base sheet 3 by printing, and then the transparent resin layer 33 is formed by printing on the entire back surface 3*b* of the base sheet 3 covering the diffusion portions 44. Finally, the dark print layer 24 is formed by printing on the back surface of the transparent resin layer 33, and the pushers 8 are provided on the back surface of the dark print layer 24, thereby obtaining the key sheet 41.

The key sheet 41 of this embodiment is mounted in the casing 13 together with the circuit board 14 to form a pushbutton switch device 42.

As illustrated in FIG. 13, the key sheet 41 is fixed in position inside the casing 13 such that the pushers 8 are held in contact with the metal domes 15 on the circuit board 14. The outer edge of the key sheet 41 is opposed to the LED 16 arranged on the circuit board 14.

Further, when the LED 16 emits light, the light is allowed to enter the base sheet 3 from the outer edge thereof as indicated by the arrows, and is propagated through the base sheet 3 in the surface direction. The diffusion portions 44 change the path of the light propagated in the surface direction toward the key tops 43 to effect illumination in the configurations of the display elements.

In the key sheet 41 and the pushbutton switch 42 of this embodiment, the lightproof light guiding sheet 91 has the dark print layer 24 on the front surface 3*a* side of the base sheet 3 through the intermediation of the transparent resin layer 33, and hence the dark print layer 24 can cover the intervals between the key tops 43 on the base sheet 3 and the outer periphery of the group of key tops 43, and it is possible to prevent the light emitted from the LED 16 and having undergone diffused reflection between the key sheet 41 and the circuit board 14 from leaking from the operation surface side of the key sheet 41.

As illustrated in FIG. 12, the diffusion portions 44 are formed in the configurations of the display elements, and hence it is possible to visually recognize the display elements without having to separately form display elements on the key tops 43. Further, unlike the display elements formed by print layers, the display elements formed by the diffusion portions 44 can realize a novel design in which the emitted light itself forms the display elements.

First Modification of the Fourth Embodiment

FIG. 15

Figure 15:
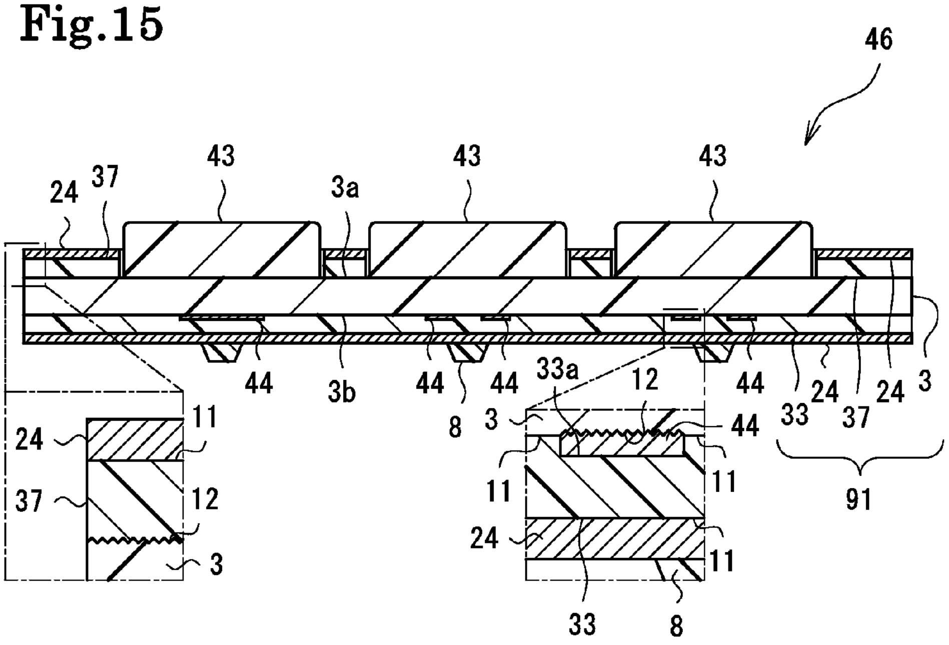
FIG. 15 is a sectional view, corresponding to FIG. 2, of a key sheet according to a first modification of the fourth embodiment.

FIG. 15 illustrates a key sheet 46 according to a first modification. In the key sheet 46 of this embodiment, the fixation surface of the base sheet 3 to be fixed to the transparent resin layer 37 is formed as the rough surface 12.

The fixation surface of the transparent resin layer 37 fixed to the dark print layer 24 is the smooth surface 11, and hence the light entering the transparent resin layer 37 from the base sheet 3 is not easily allowed to enter the dark print layer 24, making it substantially possible to prevent light absorption by the dark print layer 24. Thus, the quantity of light propagated through the base sheet 3 can be made less subjected to reduction, making it possible to make the illumination luminance of the key sheet 46 less subject to reduction.

In the key sheet 46 of the first modification, the base sheet 3, which is a "light guiding sheet," two dark print layers 24, and two transparent resin layers 37 form a lightproof light guiding sheet 91 having the smooth surfaces 11 between the base sheet 3 and the dark print layers 24.

Second Modification of the Fourth Embodiment

FIG. 16

Figure 16:
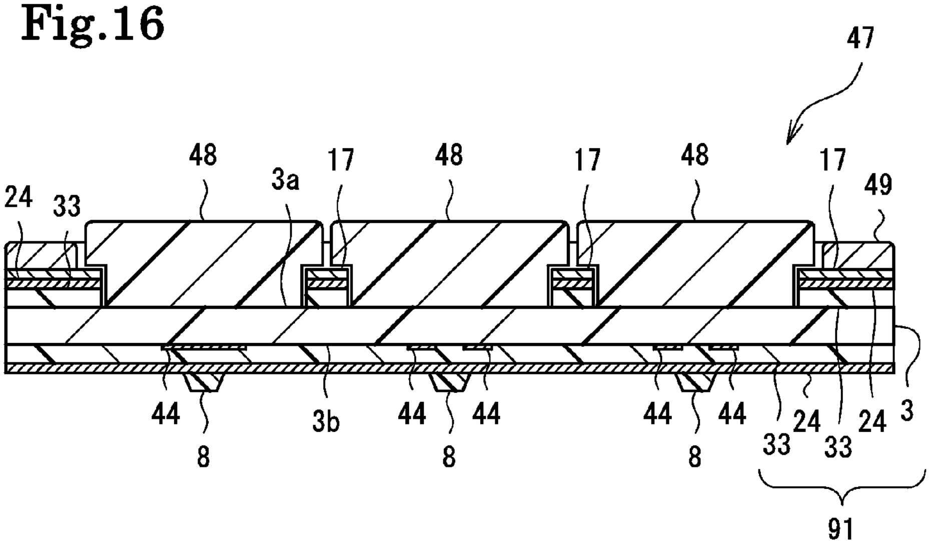
FIG. 16 is a sectional view, corresponding to FIG. 2, of a key sheet according to a second modification of the fourth embodiment.

FIG. 16 illustrates a key sheet 47 according to a second modification. In the key sheet 47 of this embodiment, there are provided key tops 48 and a top cover 49, with the gap around the key tops 48 being small.

The key tops 47 are formed such that their top-surface-side side surfaces protrude outwardly, and the top cover 49 is formed as a frame without any partition. On the operation surface side of the dark print layer 24, there are provided decoration layers 17. As in the case of the key sheet 41, also in this embodiment, both the surface of the dark print layer 24 opposed to the transparent resin layer 33 and the surface of the transparent resin layer 33 opposed to the dark print layer 24 are formed as the smooth surfaces 11.

In the key sheet 47, it is possible to make it hard for light to leak through the gaps between the key tops 48 arranged at outwardly small intervals. Further, the outer edges and the periphery of the key tops 48 are decorated with the decoration layers 17, and, within the key tops 48, it is possible to recognize the emitted light against a background of the dark print layer 24 in the configurations of the display elements, thus making it possible to realize a novel design. Further, this emitted light is due to the diffusion portions 44 formed on the depth side of the decoration layers 17, and hence the display elements are endowed with a three-dimensional decoration effect making them seem to sink deep.

Third Modification of the Fourth Embodiment

FIG. 19

Figure 19:
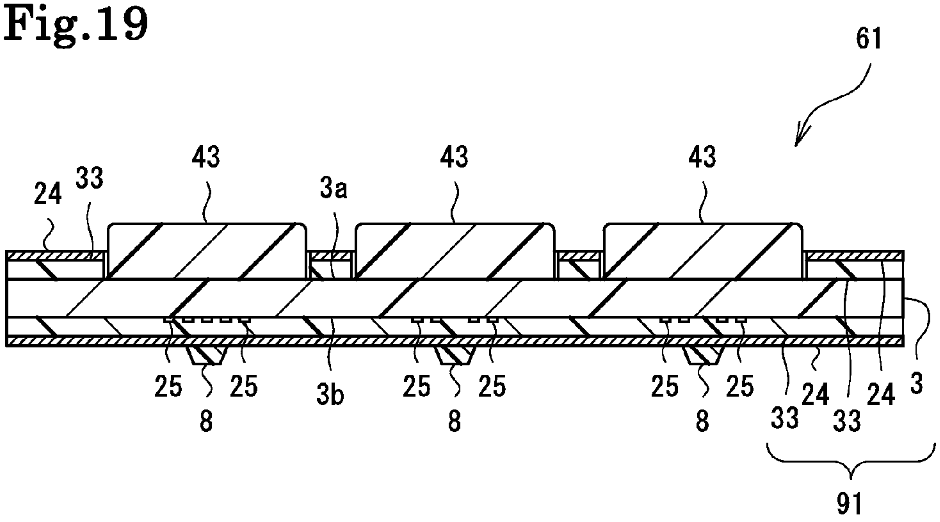
FIG. 19 is a sectional view, corresponding to FIG. 2, of a key sheet according to a third modification of the fourth embodiment.

FIG. 19 illustrates a key sheet 61 according to a third modification. In the key sheet 61 of this embodiment, diffusion portions 25 are in a dot-like dispersed configuration, constituting the display elements.

Since the diffusion portions 25 are formed in the configurations of the display elements, the display elements can be visually recognized without having to separately form display elements on the key tops 43. Further, the light propagated in the surface direction of the base sheet 3 is transmitted to the key tops 43 in the configurations of the display elements, and hence, unlike the display elements formed by print layers, they can realize a novel design in which the emitted light itself forms the display elements.

Fifth Embodiment

Figure 17:
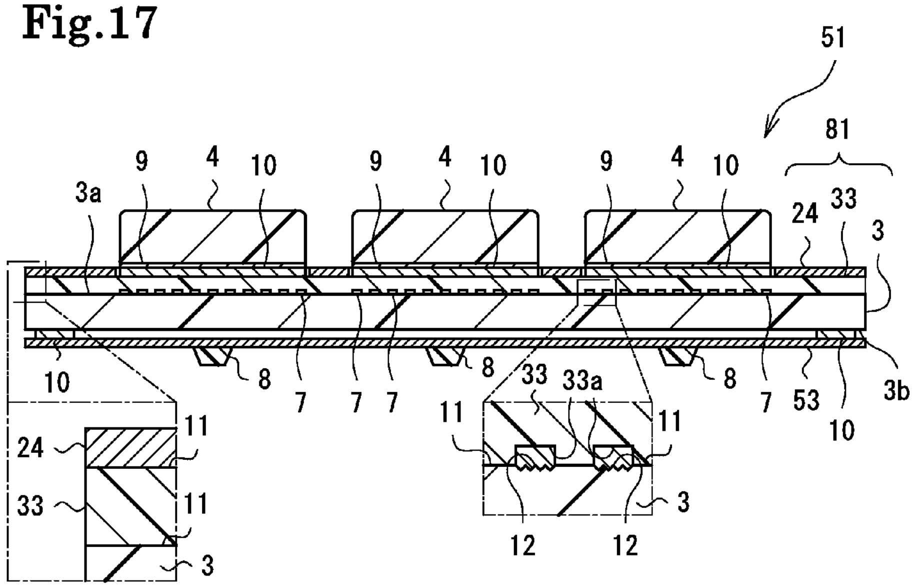
FIG. 17 is a sectional view, corresponding to FIG. 2, of a key sheet according to a fifth embodiment.
Figure 18:
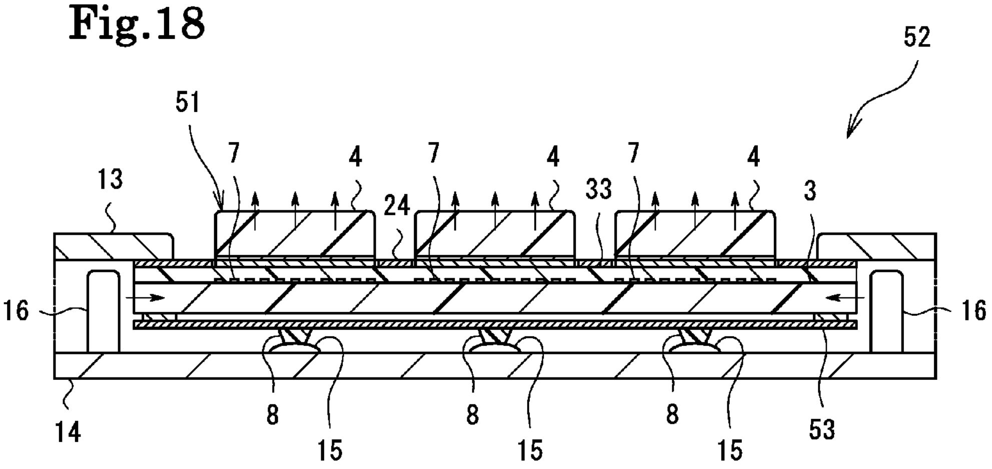
FIG. 18 is an enlarged sectional view of a pushbutton switch to which the key sheet according to the fifth embodiment is mounted.

FIGS. 17 and 18

FIG. 17 illustrates a key sheet 51 according to this embodiment, and FIG. 18 illustrates a pushbutton switch 52 according to this embodiment. FIG. 17 is a sectional view of the key sheet 51, and FIG. 18 is an enlarged sectional view of the pushbutton switch 52 with the key sheet 51 mounted thereto. The key sheet 51 differs from the key sheet 31 of the third embodiment in that the top cover 5 is eliminated, that the transparent resin layer 33 and the dark print layer 24 are provided on the operation surface side of the base sheet 3, and that a dark print layer 53 is provided on the back surface side of the base sheet 3 through the intermediation of the adhesion layers 10. The construction of the other members and the effects thereof are the same as those of the above-mentioned embodiment.

The transparent resin layer 33 is formed of a transparent resin coating film formed by applying a non-corrosive coating liquid such as an ink or coating material non-corrosive to the base sheet 3, and is fixed to the smooth surface 11 of the front surface 3_a_ of the base sheet 3. Further, there are provided recesses 33_a_ filled with the diffusion portions 7. Further, the surface of the transparent resin layer 33 fixed to the dark print layer 53 is the smooth layer 11. When, as in this embodiment, the transparent resin layer 33 is provided on the front surface 3_a_ of the base sheet 3, it is desirable for the transparent resin layer 33 to be formed of a resin whose refractive index is smaller than that of the base sheet 3.

The dark print layer 53 is formed of a resin film, and is a layer of a dark color such as black or dark blue through which light is not easily transmitted. The dark print layer 53 is fixed to the base sheet 3 by means of the adhesion layers 10 provided in the outer periphery of the back surface 3_b_ of the base sheet 3. On the back surface of the dark print layer 53, there are provided the pushers 8 in correspondence with the key tops 4.

Examples of the material for the resin film used in the dark print layer 53 include a polyethylene resin, a polypropylene resin, a polystyrene resin, a polycarbonate resin, a polyethylene terephthalate resin, a polybutylene terephthalate resin, an acrylic resin, a polyamide resin, a polyurethane resin, and an acrylonitrile-butandiene-styrene copolymer resin.

In the key sheet 51 of the fifth embodiment, the base sheet 3, which is a "light guiding sheet," dark print layer 24, and transparent resin layer 33 form a lightproof light guiding sheet 81 having the smooth surfaces 11 between the base sheet 3 and the dark print layer 24.

Next, the method of manufacturing the key sheet 51 is described.

First, the diffusion portions 7 are formed on the front surface 3_a_ of the base sheet 3 by printing, and then the transparent resin layer 33 is formed by printing on the entire front surface 3_a_ of the base sheet 3 covering the diffusion portions 7. Next, the dark print layer 24 is formed by printing on the operation surface side of the transparent resin layer 33, and then the key tops 4 having the print layers 9 on the back surfaces thereof are fixed thereto by means of the adhesion layers 10. Finally, the dark print layer 53 formed of a resin film provided with the pushers 8 on the back surface thereof is fixed to the back surface 3*b* of the base sheet 3 by means of the adhesion layer 10, whereby the key sheet 51 is obtained.

The key sheet 51 of this embodiment is mounted in the casing 13 together with the circuit board 14 to form a pushbutton switch device 52.

As illustrated in FIG. 17, the key sheet 51 is fixed in position inside the casing 13 such that the pushers 8 are held in contact with the metal domes 15 on the circuit board 14. The outer edge of the key sheet 51 is opposed to the LED 16 arranged on the circuit board 14.

Further, when the LED 16 emits light, the light is allowed to enter the base sheet 3 from the outer edge thereof as indicated by the arrows, and is propagated through the base sheet 3 in the surface direction. The diffusion portions 7 change the path of the light propagated in the surface direction toward the key tops 4 to effect illumination of the key tops 4.

In the key sheet 51 and the pushbutton switch 52 of this embodiment, the transparent resin layer 33 is formed of a resin whose refractive index is smaller than that of the base sheet, and hence it is possible to enlarge the critical angle of the total reflection at the front surface 3*a* of the base sheet 3, making it possible to reduce light leakage from the base sheet 3. Thus, the light propagated through the base sheet 3 can be efficiently transmitted to the entire base sheet 3, making it possible to brightly illuminate the key tops 4 due to the diffusion portions 7.

Since the dark print layer 53 covers the back surface 3*b* side of the base sheet 3, it is possible to prevent the light that has undergone diffused reflection between the key sheet 51 and the circuit board 14 from entering the base sheet 3 from the back surface 3*b* side of the base sheet 3. Further, the dark print layer 24 provided on the front surface side of the base sheet 3 covers the intervals between the key tops 4 on the transparent resin layer 33 and the outer periphery of the group of key tops 4, and hence light is not easily allowed to leak through the operation surface of the key sheet 51.

Other Modifications

The above-mentioned embodiments of the present invention have only been presented by way of example. That is, the above-mentioned embodiments allow modifications as appropriate as to whether the top cover 5, 49 is to be provided or not, and as to whether the diffusion portions 7, 25, 44 are to be formed in a dot-like form or not. Further, it is only necessary to provide a smooth surface between the base sheet 3 and the dark print layer 6, 24, 38, 53, and the position where the smooth surface 11 is formed is not restricted to that of the above-mentioned embodiments.

EXAMPLES

In the following, specific examples are described along with the brightness with which illumination is to be effected.

1. Preparation of Specimens:

Using a polycarbonate resin film of a thickness of 300 μm as the base sheet (3), the following Specimens 1 through 5 were prepared.

Specimen 1:

The key tops (4) having the print layers (9) on the back surfaces thereof and the top cover (5) were fixed to the front surface (3*a*) of the base sheet (3) formed of a polycarbonate resin film of a thickness of 300 μm by means of the adhesion layers (10). Further, on the back surface (3*b*) of the base sheet (3), there were formed the diffusion portions (7) arranged in a dot-like dispersed fashion in correspondence with the configuration of the key tops (4) by printing using a solvent type printing ink, and then the dark print layer (24) formed of an aqueous acrylic resin was formed by printing on the entire back surface (3*b*) of the base sheet (3) covering the diffusion portions (7). After this, the pushers (8) were provided on the back surface of the dark print layer (24), thereby preparing the key sheet (1), which served as Specimen 1.

In Specimen 1, the dark print layer (24) is formed on the back surface (3*b*) of the base sheet (3), whereas the front surface of the base sheet (3) opposed to the dark print layer (24) is maintained as the smooth surface (11). Regarding the maintenance and formation of the smooth surface (11), after the formation of the dark print layer (24), wiping-off was effected before the dark print layer (24) had been solidified to observe for evaluation the surface of the base sheet (3) to which the dark print layer (24) was applied, and there was no change in the surface condition of the base sheet (3) before and after the application of the dark print layer (24). The Specimens described below were also observed in the same manner for the surface condition thereof to see whether the observed surface was the smooth surface (11) or the rough surface (12). If the front surface of the base sheet (3) was the smooth surface (11), it means the base sheet (3), which is formed of a polycarbonate resin film, had not been corroded through formation by printing of the dark print layer (24) formed of an aqueous acrylic resin.

Specimen 2:

As in the case of Specimen 1, the key tops (4) and the top cover (5) were fixed to the front surface (3*a*) of the base sheet (3) by means of the adhesion layers (10). Further, on the back surface (3*b*) of the base sheet (3), there were formed by printing the diffusion portions (7) arranged in a dot-like dispersed fashion in correspondence with the configuration of the key tops (4), and then the transparent resin layer (33) formed of a non-solvent type ultraviolet curing acrylic resin was formed by printing on the entire back surface (3*b*) of the base sheet (3) covering the diffusion portions (7). Further, the dark print layer (24) formed of a solvent-containing urethane resin was formed on the back surface of the transparent resin layer (33) by printing, and the pushers (8) were provided on the back surface of the dark print layer (24) to thereby prepare the key sheet (31). The key sheet (31) was used as Specimen 2.

In Specimen 2, the smooth surface (11) is formed on the back surface (3*b*) of the base sheet (3) opposed to the transparent resin layer (33), and the smooth surface (11) is formed on the front surface of the transparent resin layer (33) opposed to the dark print layer (24). This is due to the fact that the base sheet (3) formed of a polycarbonate resin film was not corroded through the formation by printing of the transparent resin layer (33) formed of a non-solvent type ultraviolet curing acrylic resin, and that the transparent resin layer (33) was not corroded through the formation by printing of the dark print layer (24) formed of a solvent-containing urethane resin, either.

Specimen 3:

As in the case of Specimen 1, the key tops (4) and the top cover (5) were fixed to the front surface (3*a*) of the base sheet (3) by means of the adhesion layers (10). Further, on the back surface (3*b*) of the base sheet (3), there were formed by printing the diffusion portions (7) arranged in a dot-like dispersed fashion in correspondence with the configuration of the key tops (4), and then the transparent resin layer (33) formed of an aqueous acrylic resin was formed by printing on the entire back surface (3*b*) of the base sheet (3) covering the diffusion portions (7). Further, the dark print layer (24) formed of a solvent-containing urethane resin was formed on the back surface of the transparent resin layer (33) by printing, and the pushers (8) were provided on the back surface of the dark print layer (24) to thereby prepare the key sheet (35). The key sheet (35) was used as Specimen 3.

In Specimen 3, the smooth surface (11) is formed on the back surface (3*b*) of the base sheet (3) opposed to the transparent resin layer (33), and the rough surface (12) is formed on the surface of the transparent resin layer (33) opposed to the dark print layer (38). This is due to the fact that the base sheet (3) formed of a polycarbonate resin film was not corroded through the formation by printing of the transparent resin layer (33) formed of an aqueous acrylic resin, and that the transparent resin layer (33) was corroded through the formation by printing of the dark print layer (38) formed of a solvent-containing urethane resin.

Specimen 4:

As in the case of Specimen 1, the key tops (4) and the top cover (5) were fixed to the front surface (3*a*) of the base sheet (3) by means of the adhesion layers (10). Further, on the back surface (3*b*) of the base sheet (3), there were formed by printing the diffusion portions (7) arranged in a dot-like dispersed fashion in correspondence with the configuration of the key tops (4), and then the transparent resin layer (37) formed of a solvent-containing acrylic resin was formed by printing on the entire back surface (3*b*) of the base sheet (3) covering the diffusion portions (7). Further, the dark print layer (24) formed of an aqueous acrylic resin was formed on the back surface of the transparent resin layer (37) by printing, and the pushers (8) were provided on the back surface of the dark print layer (24) to thereby prepare the key sheet. The key sheet was used as Specimen 4.

In Specimen 4, the rough surface (12) is formed on the back surface (3*b*) of the base sheet (3) opposed to the transparent resin layer (37), and the smooth surface (11) is formed on the surface of the transparent resin layer (37) opposed to the dark print layer (24). This is due to the fact that the base sheet (3) formed of a polycarbonate resin film was corroded through the formation by printing of the transparent resin layer (37) formed of a solvent-containing acrylic resin, and that the transparent resin layer (37) was not corroded through the formation by printing of the dark print layer (24) formed of an aqueous acrylic resin.

Specimen 5:

As in the case of Specimen 1, the key tops (4) and the top cover (5) were fixed to the front surface (3*a*) of the base sheet (3) by means of the adhesion layers (10). Further, on the back surface (3*b*) of the base sheet (3), there were formed by printing the diffusion portions (7) arranged in a dot-like dispersed fashion in correspondence with the configuration of the key tops (4), and then the dark print layer formed of a solvent-containing acrylic resin was formed by printing on the entire back surface (3*b*) of the base sheet (3) covering the diffusion portions (7). After this, the pushers (8) were provided on the back surface of the dark print layer to thereby prepare Specimen 5.

In Specimen 5, the rough surface (12) is formed on the back surface (3*b*) of the base sheet (3) opposed to the dark print layer. This is due to the fact that the base sheet (3) formed of a polycarbonate resin film was corroded through the formation by printing of the dark print layer formed of a solvent-containing acrylic resin.

Specimen 6:

As in the case of Specimen 1, the key tops (4) and the top cover (5) were fixed to the front surface (3*a*) of the base sheet (3) by means of the adhesion layers (10). Further, on the back surface (3*b*) of the base sheet (3), there were formed by printing the diffusion portions (7) arranged in a dot-like dispersed fashion in correspondence with the configuration of the key tops (4), and then the transparent resin layer formed of a solvent-containing acrylic resin was formed by printing on the entire back surface (3*b*) of the base sheet (3) covering the diffusion portions (7). Further, the dark print layer formed of a solvent-containing urethane resin was formed on the back surface of the transparent resin layer by printing, and the pushers (8) were provided on the back surface of the dark print layer to thereby prepare the key sheet. The key sheet was used as Specimen 6.

In Specimen 6, the rough surface (12) is formed on the back surface (3*b*) of the base sheet (3) opposed to the transparent resin layer, and the rough surface (12) is formed on the front surface of the transparent resin layer opposed to the dark print layer. This is due to the fact that the base sheet (3) formed of a polycarbonate resin film was corroded through the formation by printing of the transparent resin layer formed of a solvent-containing acrylic resin, and that the transparent resin layer was corroded through the formation by printing of the dark print layer formed of a solvent-containing urethane resin.

2. Test Method:

Each Specimen was mounted in the casing (13), and the LED (16) was caused to emit light, with the brightness on the operation surface side of each Specimen being visually evaluated. Table 1 illustrates evaluation results. Regarding the marks for evaluating the brightness of each Specimen, the brightness of the key sheet provided with no dark print layer (24, 38) was estimated as 10 marks, the marks gradually decreasing as the darkness increases.

3. Test Results:

As illustrated in Table 1, in Specimens 1 through 4, there is little reduction in illumination luminance. In Specimens 1 through 4, the smooth surface (11) is provided between the base sheet (3) and the dark print layer (24, 38), and hence it is possible to make it hard for the light propagated through the interior of the base sheet (3) to enter the dark print layer (24, 38) due to the provision of the smooth surface (11), thus making it substantially possible to avoid light absorption by the dark print layer (24, 38).

In Specimen 2, in which both the interface between the base sheet (3) and the transparent resin layer (33, 37) and the interface between the transparent resin layer (33, 37) and the dark print layer (24, 38) are formed as the smooth surfaces (11), it was possible to enhance the illumination luminance as compared with Specimens 3 and 4, in which one of the interfaces is the rough surface (12). Of Specimens 3 and 4, the latter was somewhat superior to the former in terms of illumination luminance.

However, in Specimens 5 and 6, the illumination luminance is rather low. It is to be assumed that this is due to the fact that, in Specimens 5 and 6, there is no smooth surface (11) between the base sheet (3) and the dark print layer (6), and that the rough surface (12) exists therebetween, with the result that the light propagated through the interior of the base sheet (3) is absorbed by the dark print layer (6).

TABLE 1

| | Specimen 1 | Specimen 2 | Specimen 3 | Specimen 4 | Specimen 5 | Specimen 6 |
|---|---|---|---|---|---|---|
| Surface of the base sheet opposed to the dark print layer | Smooth surface | — | — | — | Rough surface | — |
| Surface of the base sheet opposed to the transparent resin layer | — | Smooth surface | Smooth surface | Rough surface | — | Rough surface |
| Surface of the transparent resin layer opposed to the dark print layer | — | Smooth surface | Rough surface | Smooth surface | — | Rough surface |
| Brightness evaluation marks | 4 | 9 | 6 | 7 | 1 | 2 |

What is claimed is:

1. A key sheet allowing illumination, comprising:

a base sheet formed of a transparent resin film having a smooth surface, the base sheet being a light guiding sheet;

at least one depressing operation portion having at least an operation surface for operation by a user; and a dark print layer provided on the smooth surface, wherein the dark print layer absorbs light between the dark print layer and a circuit board, and wherein the smooth surface reflects light which is directed toward the dark print layer within the base sheet without diffusion.

2. A key sheet according to claim 1, wherein the dark print layer is formed of a cured body of a coating liquid non-corrosive to the base sheet.

3. A key sheet according to claim 1, wherein a transparent resin layer is provided between the base sheet and the dark print layer.

4. A key sheet according to claim 3, wherein the transparent resin layer is formed of a cured body of a coating liquid non-corrosive to the base sheet.

5. A key sheet according to claim 3, wherein the transparent resin layer is formed of a cured body of one of a non-solvent type coating liquid, an aqueous solvent type coating liquid, and an alcoholic solvent type coating liquid, which are non-corrosive to the base sheet.

6. A key sheet according to claim 3, wherein the dark print layer is formed of a cured body of a coating liquid non-corrosive to the transparent resin layer.

7. A key sheet according to claim 1, wherein the base sheet has a top surface and a bottom surface, the dark print layer is provided on the entire bottom surface of the base sheet.

8. A key sheet according to claim 1, wherein, on at least one surface of the base sheet, diffusion portions turning an opposing surface of the base sheet into a rough surface and transmitting light propagated in a surface direction of the base sheet to the at least one depressing operation portion are provided.

9. A key sheet according to claim 8, wherein diffusion configurations of the diffusion portions form display elements.

10. A lightproof light guiding sheet, comprising:

a light guiding sheet having a smooth surface; and a dark print layer provided on the smooth surface, wherein the dark print layer absorbs light between the dark print layer and a circuit board, and wherein the smooth surface reflects light which is directed toward the dark print layer within the base sheet without diffusion.

11. A lightproof light guiding sheet according to claim 10, wherein a transparent resin layer is provided between the light guiding sheet and the dark print layer.

12. A key sheet according to claim 10, wherein the base sheet has a top surface and a bottom surface, the dark print layer is provided on the entire bottom surface of the base sheet.

13. A pushbutton switch, comprising:

a key sheet allowing illumination, comprising, a base sheet formed of a transparent resin film having a smooth surface, the base sheet being a light guide sheet, at least one depressing operation portion having at least an operation surface for operation by a user, and a dark print layer provided on the smooth surface; and a circuit board comprising a contact switch and an inner light source, wherein the dark print layer absorbs light between the dark print layer and the circuit board, and wherein the smooth surface reflects light which is directed toward the dark print layer within the base sheet without diffusion.

14. A pushbutton switch according to claim 13, wherein a transparent resin layer is provided between the base sheet and the dark print layer.

15. A pushbutton switch according to claim 13, wherein the dark print layer is provided on a top surface of the base sheet, and wherein the dark print layer covers intervals between the depressing operation portions on the base sheet.

16. A pushbutton switch according to claim 14, wherein the dark print layer is provided on a top surface of the base sheet, and wherein the dark print layer covers intervals between the depressing operation portions on the base sheet.

17. A method of manufacturing a key sheet, the key sheet allowing illumination, comprising:

a base sheet formed of a transparent resin film having a smooth surface, the base sheet being a light guide sheet, at least one depressing operation portion having at least an operation surface for operation by user; and a dark print layer provided on the smooth surface by applying and curing a coating liquid, wherein the smooth surface is maintained as the smooth surface without being roughened, and wherein the dark print layer absorbs light between the dark print layer and a circuit board.

18. A method of manufacturing a key sheet according to claim 17, comprising forming the dark print layer in which the dark print layer is formed by applying and curing a coating liquid non-corrosive to the base sheet.

19. A method of manufacturing a key sheet allowing illumination according to claim 17, further comprising executing providing a transparent resin layer between the base sheet and the dark print layer.

20. A method of manufacturing a key sheet allowing illumination according to claim 19, wherein, in forming the transparent resin layer, at least one of providing the transparent resin layer by applying and curing a coating liquid non-corrosive to the base sheet and providing the dark print layer by applying and curing a coating liquid non-corrosive to the transparent resin layer in executed.

* * * * *